(12) United States Patent
Hartrumpf et al.

(10) Patent No.: US 10,928,307 B2
(45) Date of Patent: Feb. 23, 2021

(54) CONFIGURABLE RETRO-REFLECTIVE SENSOR SYSTEM FOR THE IMPROVED CHARACTERIZATION OF THE PROPERTIES OF A SAMPLE

(71) Applicant: FRAUNHOFER-GESELLSCHAFT ZUR FÖRDERUNG DER ANGEWANDTEN FORSCHUNG E. V., Munich (DE)

(72) Inventors: Matthias Hartrumpf, Karlsruhe (DE); Christian Negara, Cologne (DE)

(73) Assignee: Fraunhofer-Geseilschaft zurförderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/306,492

(22) PCT Filed: Jun. 1, 2017

(86) PCT No.: PCT/EP2017/063248
§ 371 (c)(1),
(2) Date: Nov. 30, 2018

(87) PCT Pub. No.: WO2017/207681
PCT Pub. Date: Dec. 7, 2017

(65) Prior Publication Data
US 2019/0170636 A1    Jun. 6, 2019

(30) Foreign Application Priority Data

Jun. 2, 2016  (DE) ............... 10 2016 209 723.7

(51) Int. Cl.
*G01N 21/21*    (2006.01)
*G01N 21/25*    (2006.01)
(Continued)

(52) U.S. Cl.
CPC ......... *G01N 21/211* (2013.01); *G01N 21/21* (2013.01); *G01N 21/255* (2013.01); *G01N 21/55* (2013.01);
(Continued)

(58) Field of Classification Search
CPC .................................................. G01N 21/211
(Continued)

(56) References Cited

U.S. PATENT DOCUMENTS 4,469,443 A * 9/1984 Geller ................. G01N 21/538
356/364
5,610,392 A * 3/1997 Nagayama ......... G01B 11/0641
250/225
(Continued)

FOREIGN PATENT DOCUMENTS

DE    43 43 345 A1    6/1995
EP    1 056 987 A1    12/2000
(Continued)

OTHER PUBLICATIONS

Negara et al., "Ellipsometrie an gekrümmten Oberflächen" ("Ellipsometry on curved surfaces"), Conference Paper, Forum Bildverarbeitung (Forum image processing), Regensburg, Nov. 2014 (pp. 227-238).
(Continued)

*Primary Examiner* — Tarifur R Chowdhury
*Assistant Examiner* — Omar H Nixon
(74) *Attorney, Agent, or Firm* — Leydig, Voit & Mayer, Ltd.

(57) ABSTRACT

Disclosed is a retroreflector-based sensor system for optical characterization of a sample, having a transmitter for irradiating the sample, a retroflector positioned behind the sample, the transmitter, the sample, and the retroreflector being positioned such that radiation reflected back from the
(Continued)

retroreflector is again incident on the sample and is reflected back from the latter in the direction towards the transmitter, and a receiver which is positioned in the receiving beam path such that it detects radiation reflected back from the retroreflector, incident again on the sample and reflected back from the latter, in the direction towards the transmitter.

10 Claims, 10 Drawing Sheets

(51) Int. Cl.
G01N 21/55 (2014.01)
G02B 5/122 (2006.01)
(52) U.S. Cl.
CPC ....... *G02B 5/122* (2013.01); *G01N 2021/216* (2013.01); *G01N 2021/551* (2013.01)
(58) Field of Classification Search
USPC .......................................................... 356/369
See application file for complete search history.

(56) References Cited

U.S. PATENT DOCUMENTS

| | | | |
|---|---|---|---|
| 5,898,169 A | 4/1999 | Nordbryhn | |
| 6,097,491 A * | 8/2000 | Hartrumpf | G01S 17/42 250/559.38 |
| 6,858,836 B1 | 2/2005 | Hartrumpf | |
| 8,823,926 B2 | 9/2014 | Hanssen et al. | |
| 9,222,879 B2 | 12/2015 | Hartrumpf | |
| 2002/0191184 A1* | 12/2002 | Luxem | G01V 8/14 356/369 |
| 2008/0100911 A1* | 5/2008 | Tafas | G01N 21/6458 359/385 |
| 2009/0002697 A1* | 1/2009 | Freese | G01J 3/02 356/300 |
| 2010/0152115 A1* | 6/2010 | Weber | G01N 33/6842 514/1.1 |
| 2010/0274501 A1 | 10/2010 | Rekenthaler et al. | |
| 2010/0290032 A1 | 11/2010 | Bugge | |
| 2012/0113423 A1 | 5/2012 | Groswasser | |
| 2013/0148111 A1 | 6/2013 | Hanssen et al. | |
| 2013/0194584 A1* | 8/2013 | Holzapfel | G01B 11/14 356/498 |
| 2013/0222803 A1 | 8/2013 | Hartrumpf | |
| 2016/0054217 A1 | 2/2016 | Hartrumpf | |
| 2016/0054496 A1* | 2/2016 | Ichihashi | G02B 5/3083 250/338.1 |
| 2017/0336316 A1 | 11/2017 | Hartrumpf | |

FOREIGN PATENT DOCUMENTS

| | | |
|---|---|---|
| EP | 2 597 451 A2 | 5/2013 |
| NO | 20 150 765 A | 6/2015 |
| WO | WO 99/41568 A1 | 8/1999 |
| WO | WO 2010/026579 A2 | 3/2010 |
| WO | WO 2012/038036 A1 | 3/2012 |

OTHER PUBLICATIONS

Neuschaefer-Rube et al., "Simultaneous measurement of surface geometry and material distribution by focusing ellipsotopometry," *Applied Optics* 41(22): 4526-4535 (2002).
Azzam, "Division-of-amplitude Photopolarimeter (DOAP) for the simultaneous measurement of all four stokes parameters of light," *Optica Acta* 29(5): 685-689 (1982).
European Patent Office, International Search Report in International Application No. PCT/EP2017/063248 (dated Nov. 30, 2017).
European Patent Office, Written Opinion in International Application No. PCT/EP2017/063248 (dated Nov. 30, 2017).
International Bureau of WIPO, International Preliminary Report on Patentability in International Application No. PCT/EP2017/063248 (dated Dec. 4, 2018).

* cited by examiner

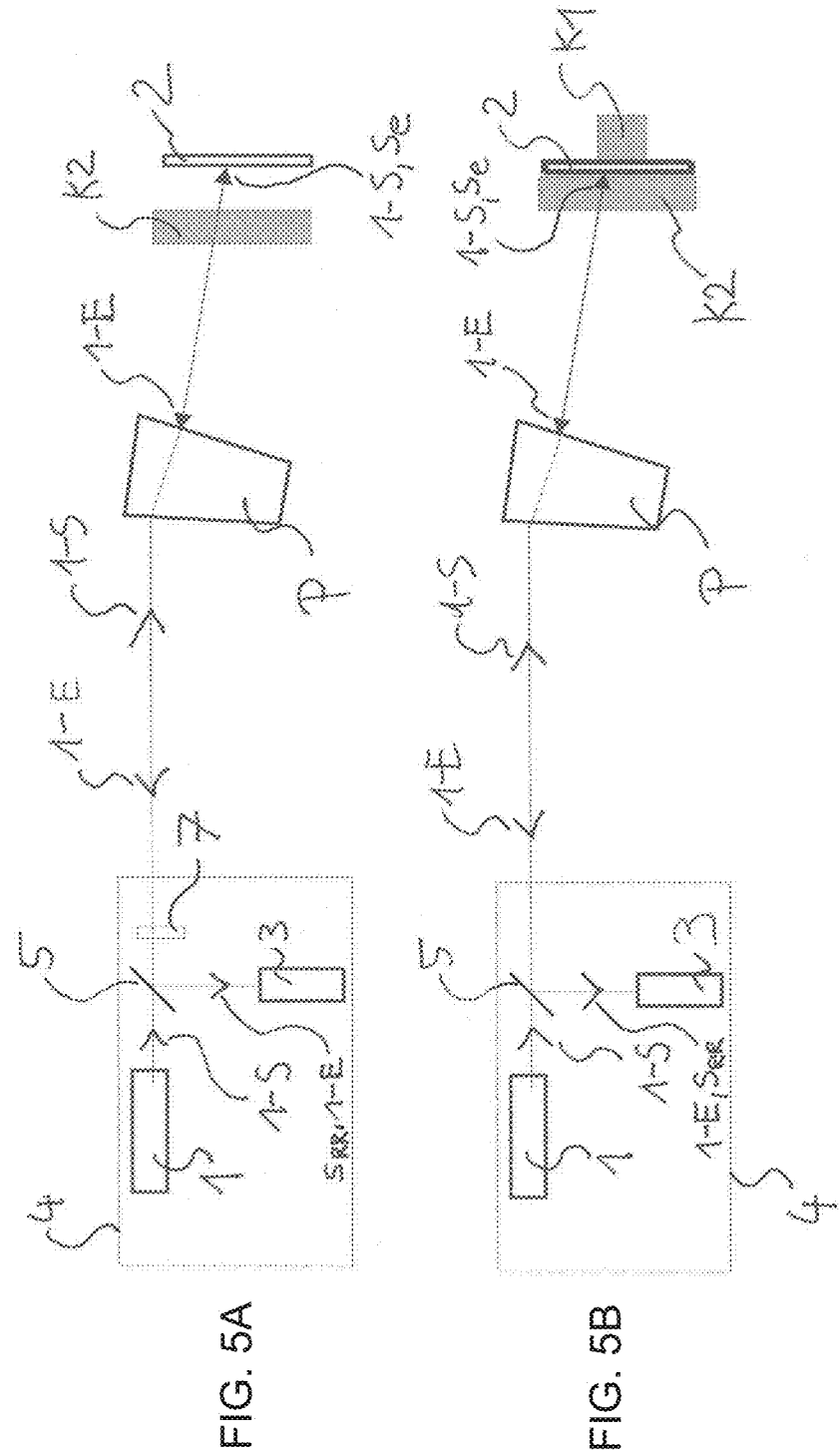

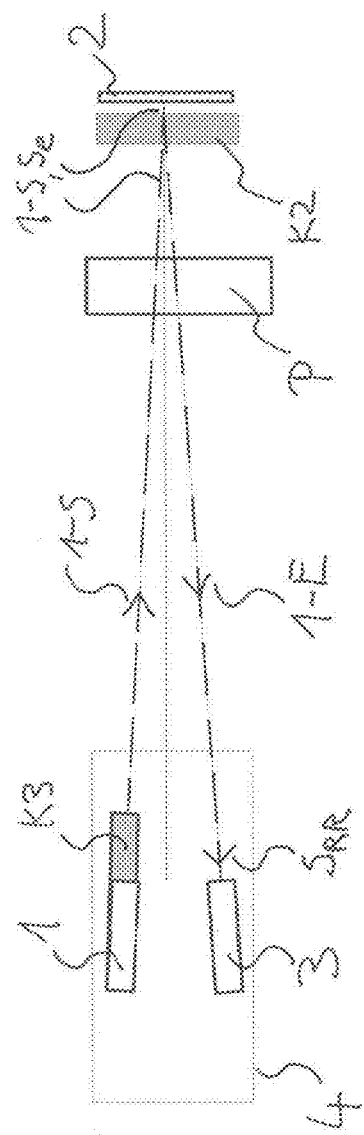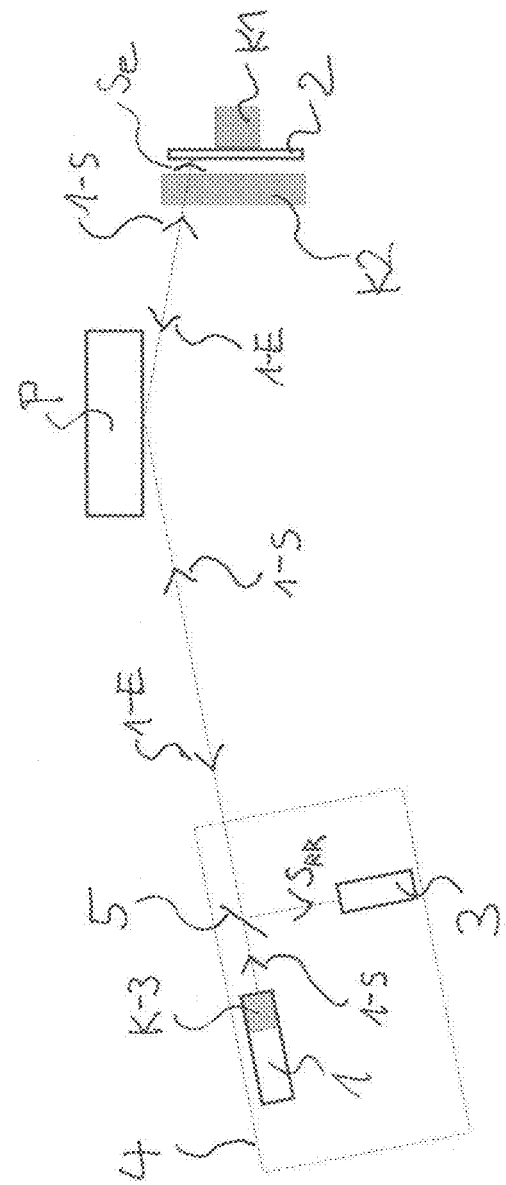
FIG. 8A
FIG. 8B

CONFIGURABLE RETRO-REFLECTIVE SENSOR SYSTEM FOR THE IMPROVED CHARACTERIZATION OF THE PROPERTIES OF A SAMPLE

CROSS-REFERENCE TO RELATED APPLICATIONS

This patent application is the U.S. national phase of International Application No. PCT/EP2017/063248, filed on Jun. 1, 2017, which claims the benefit of German Patent Application No. 10 2016 209 723.7, filed Jun. 2, 2016, the disclosures of which are incorporated herein by reference in their entireties for all purposes.

I. STATE OF THE ART

Subsequently, in fact some of the references also used for the description of the invention are introduced; within the scope of the entire description, identical references are used for identical or corresponding parts of the described systems.

Retroreflex sensor systems (termed alternatively also retroreflex sensors and also abbreviated as sensors) or corresponding arrangements according to the state of the art (cf. [STT1], [STT2] and [STT3]) are basically constructed as shown in FIGS. 1A and 1B:

A transmitter 1 illuminates the sample P. The light incident on the sample passes either through the sample (transmission) or, after reflection on the sample, towards the retroreflector 2 and, from there, is reflected back on the same path or with a beam offset in the direction of transmitter 1. It is generally irrelevant thereby for the operating principle of the sensor whether widening of the back-reflected beams results by means of the reflector, as is known for example from film reflectors. The receiver 3 detects and analyses the back-reflected radiation. It is subsequently also termed alternatively detector. Provided the beam offset or the widening of the back-reflected light make it possible, the receiver can be disposed beside the transmitter (cf. FIG. 1A). This is possible in particular when the retroreflector 2 leads to a defined beam offset or is not ideal and the radiation incident thereon is reflected back in a cone. Otherwise, the back-reflected radiation is deflected via a beam splitter 5 between transmitter and sample in the direction of the receiver (cf. FIG. 1B). In most embodiments, transmitter and receiver are integrated in one and the same housing 4 (to form a "transceiver").

During transmission or reflection on the sample or on the object, the result can be polarisation changes in the radiation. According to the application, these polarisation changes are undesired or in fact the sought measured signal. Cases in which these polarisation changes are undesired, in which they therefore interfere with determination of the object properties, are for example:
  detection of decorative defects (inclusions, scratches or the like)
  detection or measurement of object structures (for example outer edges or contours of the object, interfaces inside the object, . . . ).

Cases in which the polarisation changes are intended to be evaluated are for example:
  detection of tensions in the material
  detection of the type of material or layer thickness by means of ellipsometry.

In the case of arrangements according to the state of the art, this (or other) different information about the object is generally superimposed in the measured signal and cannot, or only conditionally, can be differentiated from each other. In addition, when using reflectors 2 with microstructures (films with microprisms, microglass balls etc.), the result can be increased noise due to the microstructure of the reflector.

In the above-described state of the art, the result is for example the following restrictions, in the case of ellipsometric measurements:
  restriction of the unequivocal range for determining the ellipsometric characteristic variables $\psi$, $\Delta$.
  restriction in the simultaneous examination for decorative defects or superimposition of the signals of these defects and the polarimetric or ellipsometric signals.
  unknown angles of inclination of the sample in and perpendicular to the plane of incidence.
  noise due to the microstructure of the reflector and/or speckle.

STATE OF THE ART

[STT1] WO 99/41568 A1=application PCT/EP2011/004553 or EP 1056987.
[STT2] WO 2012/038036 A1
[STT3] "Ellipsometrie an gekrümmten Oberflächen" (Ellipsometry on curved surfaces), Conference Paper, November 2014, Forum image processing 2014, Regensburg, DOI: 10.5445/KSP/1000043608.
[STT4] "Simultaneous measurement of surface geometry and material distribution by focusing ellipsotopometry", U. Neuschaefer-Rube and W. Holzapfel, APPLIED OPTICS, vol. 41, no. 22, 1 Aug. 2002.
[STT5] R. M. A. Azzam "Division-of-amplitude Photopolarimeter (DOAP) for the Simultaneous Measurement of All Four Stokes Parameters of Light.", Optica Acta: International Journal of Optics, 29(5): 685-689, 1982.

II. INTRODUCTION INTO AND ALSO THE OBJECT OF THE PRESENT INVENTION

Starting from the state of the art, it is the object of the present invention to make possible improved optical characterisation of a sample or of an object in retroreflex arrangement. For this purpose, a retroreflector-based sensor system according to the invention, a corresponding retroreflector-based detection-, measuring- and evaluation method and also corresponding uses of such systems or methods are intended to be made available.

This object is achieved by a sensor system as described. Advantageously achievable embodiments can be deduced from the description.

Corresponding methods (and uses) result correspondingly in modification of the disclosed invention obvious to the person skilled in the art (for example by the sample being irradiated by means of radiation in the transmitter beam path, . . . until finally the radiation SRR is detected by the receiver and measured values are obtained therefrom and evaluated for optical characterisation of the sample, then said obtaining and/or evaluation being improved by said configuration means being provided).

Subsequently, the present invention is firstly described in general form, then in detail also with reference to several individual embodiments. With respect to the embodiments, it is possible, according to the claim structure, also to omit some of the shown features or to combine some of the shown features also differently with others of the shown features (also overall by way of example).

The subject of the present invention is a configurable sensor for improved optical characterisation of a sample in a retroreflex arrangement.

Such improved characterisation can be achieved, according to the invention, in particular by one single or several additional configuration(s) or configuration means (produced at the same time in a system according to the invention), which are provided subsequently also with references K1 to K6 or are abbreviated via the notations K1 to K6:

configuration means K1: a movement of the reflector by an actuator during the measurement.

configuration means K2: arrangement of (an) optical component(s) between sample and retroreflector which change(s) the polarisation, direction or the intensity of the radiation. Technically, alternatively a retroreflector can also be used equivalently which changes the polarisation, the intensity, the direction and/or the offset of the back-reflected radiation in a defined (i.e. known to the user) manner.

configuration means K3: arrangement (at least) of one modulator or switch for the polarisation state, the wavelength and/or the coherence or the radiation direction of the illumination. In some embodiments of the invention, it is thereby advantageous to implement a modulation of several of the above-mentioned parameters at the same time. One example of this is illumination with left-hand circularly polarised radiation of a first wavelength $\lambda_1$ which is switched alternately to a right-hand circularly polarised illumination at a second wavelength $\lambda_2$. The wavelengths $\lambda_1$ or $\lambda_2$ can thereby be situated in the sensitive range of the detector or outside this range (so that for example (polarised) fluorescence or non-linear optical effects on the sample can be evaluated).

configuration means K4: arrangement of one or more element(s) for changing the polarisation of the entire receiver beam path or for spectral splitting of the receiver beam path, which however thereby preferably leave(s) the polarisation and the spectral properties of the transmitter beam path unaffected.

configuration means K5: extending the receiver to form a detector or using a receiver which determines the complete Stokes- or Jones vector of the incident radiation—also without the subsidiary condition due to coherence. Alternatively and technically equivalently, a corresponding replacement of an already provided or present detector can be effected.

configuration means K6: use of a data source, e.g. CAD model, or arrangement of at least one additional further detector or sensor system for taking into account or detecting further sample properties, such as e.g. the geometric data of the sample. From these additional data, the angle of incidence of the radiation on the sample surface and/or the angle of inclination of the sample relative to the sensor coordinate system can be determined. With the help of this information, the refractive index n and the extinction coefficient k of the sample can be determined, for example from the ellipsometric measured values $\psi$, $\Delta$. Alternatively it is also possible in many cases to determine the geometric data from the ellipsometric data (measured variables of the detector) itself. The method is introduced as ellipsotopography. See "Simultaneous measurement of surface geometry and material distribution by focusing ellipsotopometry" introduced, see [STT4]. In this case, an evaluation step can be provided according to the invention in order to determine the geometry of the sample from the measured values, inter alia with the help of Fresnel formulae for the reflection coefficients.

as further configuration means (these can also be termed configuration means K7 according to the invention), (a) means for automatic calibration of the measured values can be provided. This/these configuration means can be for example (a) polarisation-obtaining or depolarising retroreflector(s) or a reflecting object or reflector with precisely known reflection characteristic. The retroreflector(s) can be introduced in a part of the transmission beam path or can be pivoted into a part of the transmission beam path. The retroreflector(s) can be positioned in the housing of the transceiver (or of a combined transmitting and receiving unit) or also outside this housing, in the latter case, preferably directly next to the sample (in the case of a reflection arrangement—in the case of a transmission arrangement, a spatial region of the retroreflector not situated in the shadow of the sample can be used).

As a function of the measuring task respectively to be achieved, a configuration (configuration means) alone or a combination of a plurality or all of the configurations or means can be advantageous in order to achieve the object according to the invention in a satisfactory manner (even better: optimally).

III. WITH RESPECT TO THE SCOPE OF THE INVENTION

A retroreflector-based sensor system according to the invention can be deduced from the description provided.

The sample is thereby not part of the system, i.e. the system consists of the other mentioned components and has a sample region in which the said sample can be positioned such that what is described in the claim is achieved. The term "optical" and the term of "radiation" generally relate to visible light, i.e. to light with (a) wavelength(s) in the range between approx. 350 nm and 780 nm. According to the invention, it is however also conceivable to use radiation sources (as transmitter) or radiations in other wavelength ranges, in particular in the UV range below 350 nm or also in the infrared range above 780 nm.

Both a transmission arrangement and a reflection arrangement of the sample are possible (cf. also the embodiments subsequently). The measured values can be in particular intensity (measured) values and/or polarisation (measured) values of the radiation.

Provided nothing different is said, the transmission beam path is the radiation path from the transmitter until its incidence on the retroreflector. Correspondingly, the receiving beam path is the radiation path from the retroreflector (after back-reflection on the latter) again back in the direction towards the transmitter and until its incidence on the receiver. The case is thereby included that possibly only genuine proportions of the radiation reach the next optically effective step (or the next optically effective means, such as e.g. the sample, the retroreflector, a configuration means or the like). For example, generally only parts of the radiation incident on the sample will actually reach the retroreflector after reflection thereof on the sample or transmission thereof through the sample (thus radiation components can be lost on/in the sample, for example by absorption, scattering . . . ). It is likewise possible that parts of the radiation reflected on the sample do not reach the retroreflector at all since they go by next to the retroreflector or are radiated past it.

The transmitter can illuminate a point-like or one- or two-dimensional region of the sample (preferably a point, a line or a surface of this sample). The receiver (detector) therefore receives that radiation or those radiation components which are reflected back from the retroreflector and which—viewed on the entire beam path, i.e. the transmitter beam path plus the receiver beam path—are reflected (at least) twice on the sample (or which have radiated through the sample twice in transmission).

Generally, the optical axes in the illumination beam path (i.e. the transmitter beam path) and in the receiving beam path (i.e. from the retroreflector back again towards the detector) are coincident at least in portions or have approximately the same orientation at least in portions. The light reflected on the sample and/or the light transmitted through the sample can be reflected back from the retroreflector principally (in the receiving beam path) on the same, i.e. the identical, optical path. This takes place for example when using a film reflector as retroreflector. However it is likewise possible that the light cast back from the retroreflector is reflected back with a parallel offset (relative to the transmitter beam path), i.e. the receiving beam path extends, at least in portions, at a spacing from and parallel to the transmitter beam path (or portions of the same). In the receiving beam path (viewed again relative to the transmitter beam path), also a generally slight widening can thereby be present.

Advantageously achievable features can be deduced from the remaining disclosure.

Preferably only precisely one (particularly preferably: the retroreflector) of the elements described in the claim is thereby moveable. Movement of the said element (or elements), such as for example the retroreflector, is effected preferably by an actuator. For example, a motor, a vibrator or the like can be used as actuator. The movement can be effected as rotation, as vibration or also as rapid to and fro movement along at least one axis (or also as a combination of such movements).

The arrangement of such (an) element(s) is generally effected at (a) defined position(s) in the transmitter beam path and/or in the receiving beam path.

For example, such an element in the transmitter beam path can be disposed between transmitter and sample. An(other) element can be disposed instead or additionally thereto in the transmitter beam path and in the receiving beam path between sample and retroreflector. Instead or in addition to the previously mentioned element(s), there can be disposed, in the receiving beam path (i.e. leaving the transmitter beam path or the radiation of the same unaffected), a (further) such element between the sample and the receiver.

One or more such element(s) can also be (an) additional light source(s) which is/are disposed for example in one or in more partial beam path/paths of the transmitter or is/are coupled via one or more beam splitters into (one) such partial beam path/paths.

Such an optical element can also concern the retroreflector itself. An example of this is a retroreflector which changes the polarisation state or the polarisation of the incident and again back-reflected radiation in a defined manner (i.e. in the manner known for the user of the retroreflector-based sensor system). Such a further example is a retroreflector which effects a defined offset between the radiation of the transmitter beam path and the radiation in the receiving beam path.

Here (as also for all other embodiment variants of the sensor system according to the invention) it applies that the sensor system, in particular the evaluation unit thereof, can operate with computer assistance, i.e. computer-assisted or microprocessor-assisted.

The sensor system, in particular the evaluation unit thereof, can comprise or be therefore a corresponding server PC or microcontroller (with suitable program and data memory).

For evaluation, suitable evaluation programs can be stored (permanently) in the program memory or loaded into the program memory. These evaluation programs are configured for evaluating the measured values or data generated from these (which can be stored in the data memory).

The information memory is thereby subsequently termed alternatively also data source.

Such means can be for example:
1. In the case where the transmitter and the receiver are positioned in a common housing (in particular: if the transmitter and the receiver are configured as laser scanner in/with such a common housing), a further retroreflector within this common housing, with the further retroreflector a part of the radiation emitted by the transmitter (in particular: a part of the scan line of said laser scanner) being reflected back (i.e. without sample contact) directly (generally therefore before leaving the common housing) into the receiver.
2. A part of the retroreflector positioned in the transmitter beam path behind the sample, said part not being covered by the sample.
3. In systems according to the invention in a reflection arrangement (i.e. generally not in the case of transmission arrangement sensor systems), one or more reference object(s) disposed in the region or next to the sample such that a part of the radiation of the transmitter beam path falls on this/these reference object(s), is reflected thereon and the last-mentioned, reflected part reaches the retroreflector.

With this/these means, in particular intensities or polarisation values can be standardised as measured values.

Scanned configuration means can thereby be in particular the already mentioned reference objects.

The beam offset can thereby be produced in particular such that the radiation widens parallel, at least in portions, along the transmitter beam path and the receiving beam path. Provided said beam offset and/or any possibly present, final beam widening on the length of the transmitter beam path and receiving beam path (taken together) allows it, the receiver can be disposed next to the transmitter or at a (generally small) spacing from the transmitter.

According to the first variant of this claim, it is also possible (for example with a suitable arrangement of additional beam splitters) to reflect the radiation more than twice, for example four times or even six times, on the sample, before it is detected as radiation $S_{RR}$.

According to the second variant of this claim, it is also possible (for example with a suitable arrangement of additional beam splitters, which for example are disposed respectively slightly tilted towards each other) to transmit the radiation more than twice, for example four times or six times, through the sample, before it is detected as radiation $S_{RR}$.

In both variants, it is thereby generally the case that respectively only a proportion of the reflected or transmitted radiation is reflected or transmitted per reflection- or transmission process. In other words, generally (slight) losses of beam components occur per process due to undirected scattering, absorption, . . . .

The housing can have a common beam entry- and beam exit opening. This is generally configured suitably in order to enable both exit of the radiation transmitted from the transmitter and receipt of the radiation, reflected back again from the retroreflector via the sample, by the receiver.

The scan system can be in particular a laser scan(ner) system or a laser scanner. The scanning can thereby be effected by means of one or more moveable mirror(s). For example, one- or two-dimensional galvanometer scanners can be used as mirror systems for the scanning.

The Figures—just as the description—show or describe the essential features of the invention. For the sake of clarity, non-essential, optical elements which are self-evident for the person skilled in the art, i.e. not affecting the main function (purely imaging or deflecting one or more partial beam path or partial beam paths) are neither illustrated nor mentioned in the description.

BRIEF DESCRIPTION OF THE SEVERAL VIEWS OF THE DRAWINGS

FIG. 4A shows the signals of individual image lines which were recorded without movement of the reflector. In contrast, FIG. 4B shows the result of an evaluation in which individual image lines were recorded with a moving reflector and were determined, in a pre-processing step, suitably such that FIG. 4B represents the course of the average values of the intensities over the image line.

FIG. 5A-5B show alternative systems according to the invention which are basically constructed as shown in FIG. 2 so that subsequently only the differences are described. The first difference is that the example systems shown in FIGS. 5A and 5B concern transmission systems.

FIG. 8A-8B shows two embodiments of retroreflex ellipsometers according to the invention for determining the ellipsometric parameters independently of the sample adjustment. FIG. 8A shows an embodiment of the invention in transmission arrangement with a light source which is disposed next to the detector and determines the ellipsometric characteristic variables in transmission. FIG. 8B shows an embodiment for determining the characteristic variables in reflection with a rotatable retroreflector 2 according to K1.

DETAILED DESCRIPTION OF THE INVENTION

The beam paths illustrated in the subsequent embodiments function in fact in embodiments without special imaging or beam-forming elements (such as e.g. lenses, diaphragms, filters or the like)—for example when using a collimated laser (as beam source) and a relatively large detector (receiver). It is obvious that in fact when using a simple lens, the size of the measured surface- or volume element of the samples and also the efficiency of the beam path can be influenced positively. Likewise obvious is the advantage of additional diaphragms and filters in the beam paths. It is therefore clear to the person skilled in the art that the principle according to the invention can be achieved also in a form in which the beam paths shown in the subsequent embodiments are merely partial beam paths of more complex optical arrangements or optical systems (e.g. systems comprising additional beam-forming elements and/or scanning or imaging systems in a linear or planar manner—e.g. one-dimensional or two-dimensional laser scanners).

Example (with reference to the subsequently described embodiment from FIG. 3): the deflection unit can have a plurality of elements (turnable or rotatable mirror(s), imaging mirror(s), one or more lens(es), one or more holographic elements etc.) in order to allow e.g. a one-dimensional or two-dimensional scanning (laser scan, preferably in the time multiplex) or imaging of the sample surface. It is equally clear to the person skilled in the art that additional lenses and diaphragms in the beam path can influence the efficiency of the beam paths and the size of the scanned surface elements of the sample. Nevertheless, the same effect of the configurations would be obtained for each light beam, hence the basic concept according to the invention can be recognised again. Also introducing filters is possible, e.g. for extraneous light compensation.

In brief: almost any beam paths can be produced according to the invention, almost any beam-forming elements can be introduced in addition into the beam path and/or almost any retroreflector configurations and -forms can be used.

IV. EMBODIMENTS, POSSIBLE EMBODIMENTS AND ADVANTAGES OF THE INVENTION

IV.1. What is Basic to the Possible System Constructions According to the Invention Subsequently, different configuration examples, i.e. embodiments of sensor systems according to the invention, are described with reference to FIGS. 2 to 10.

Figure 1:
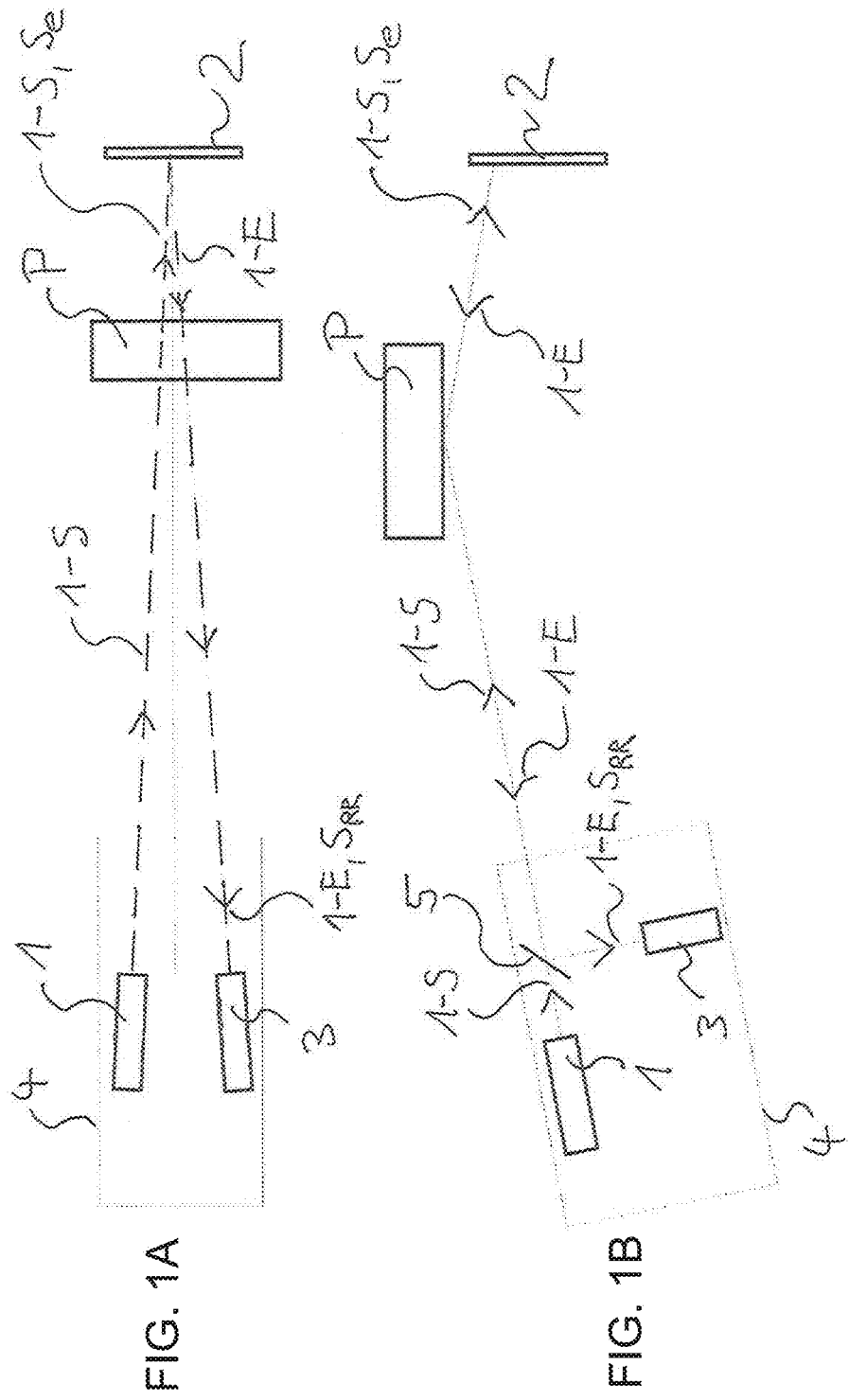
FIG. 1A-1B show retroreflex sensor systems (termed alternatively also retroreflex sensors and also abbreviated as sensors) or corresponding arrangements according to the state of the art.
Figure 2:
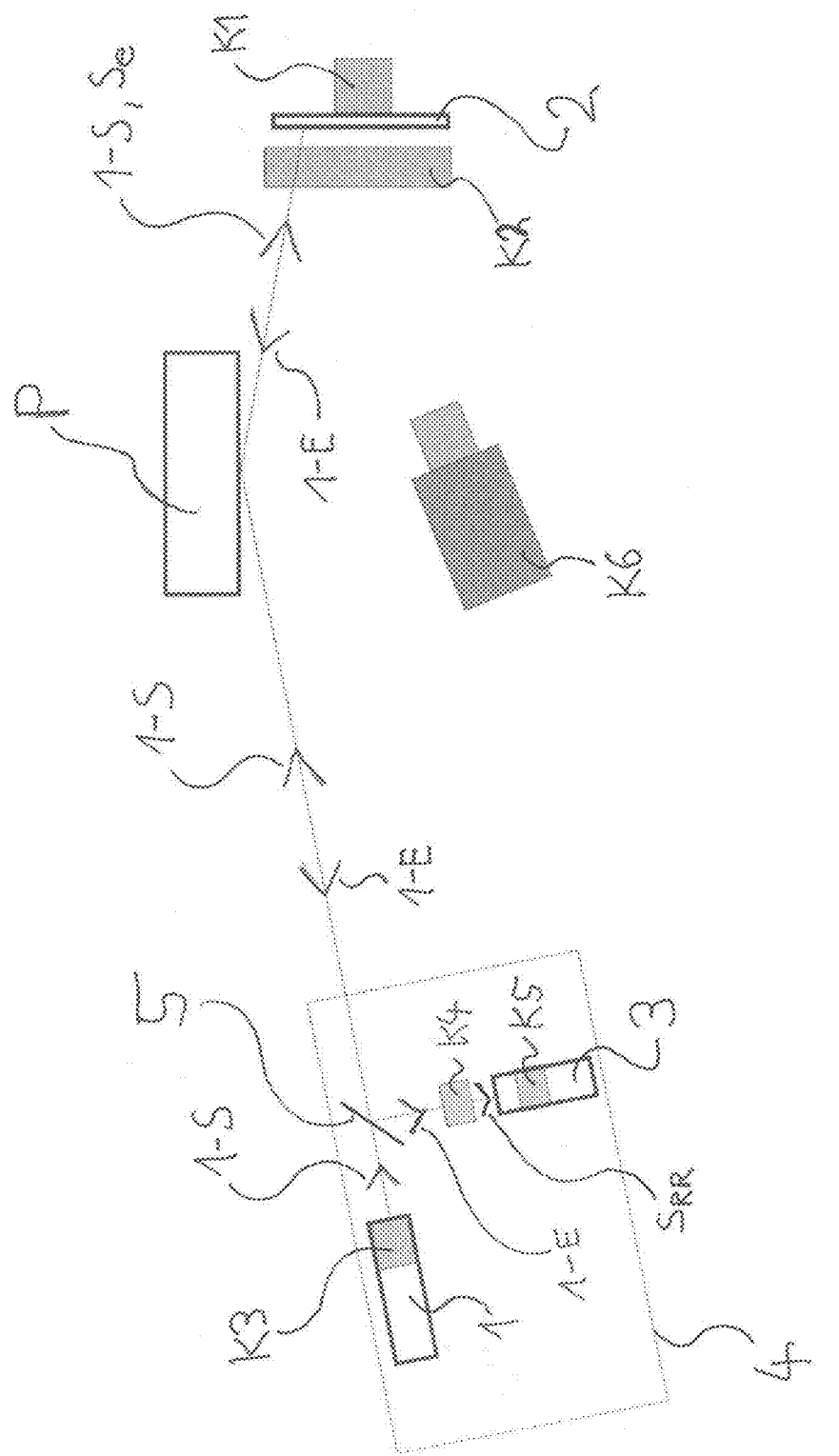
FIG. 2 shows by way of example, the configurations K1 to K6 according to the invention for optimal adaptation of a retroreflex sensor system to a measuring task or for extended characterisation of samples in the example of a point measuring system.

Thus FIG. 2 shows a possible construction in principle of the invention in which a configuration means, a plurality of configuration means or even all of the configuration means K1 to K6, as described subsequently, can be positioned e.g. in the beam path and/or can be integrated also as part of individual elements of the system.

The sensor system(s) according to FIG. 2 has/have a radiation-emitting transmitter 1 (here: laser emitting with the wavelength $\lambda$). The transmitter 1 is subsequently also termed illumination. A third configuration means K3 can be configured integrated thereon or therein, i.e. a configuration K3 (alone or together with one, more or all of the other configurations K1 to K2 and also K4 to K6) can be achieved according to FIG. 2.

The laser 1 emits light into the transmitter beam path 1-S which is incident on a beam splitter 5 and is transmitted through the latter. The transmission properties of the beam splitter (transmission degree, change in polarisation etc.) can be adapted to the measuring task. For precise evaluation of the measured signals, they need merely be known or determined by a measurement.

In the transmitter beam path 1-S, the radiation then is incident on the sample P and is reflected on the latter according to the rule of reflection (angle of incidence=angle of reflection).

This reflected radiation is incident, in the beam path 1-S, on a second configuration means K2 (if the latter, as shown in FIG. 2, is actually produced or is positioned in front of the retroreflector 2—configuration K2) and subsequently on a retroreflector 2 or directly on the reflector 2. The light passing through the configuration means K2 or the radiation $S_e$ incident on the retroreflector 2 is reflected back on the retroreflector 2 per se, i.e. reflected back into the receiving beam path 1-E, the latter 1-E extending until incident on the beam splitter 5 identically to the transmitter beam path 1-S. In other words, the radiation reflected back from the reflector 2 extends in the opposite direction along the transmitter beam path 1-S, is incident for the second time on the sample P, is reflected on the latter for the second time according to the law of reflection and hence is incident, after entry into the common housing 4 of the transmitter 1 and of the receiver 3, again on the beam splitter 5.

The beam splitter 5, according to its optical properties, reflects a part of the incoming receiving radiation 1-E in the direction towards the receiver 3. The reflection- and transmission properties of the beam splitter (transmission degree, reflection degree, change in polarisation properties in transmission and reflection etc) can be adapted to the measuring task. For precise evaluation of the measured signals, they need merely be known or determined by a measurement.

Beam splitter 5, transmitter 1 and receiver 3 are disposed here in the housing 4, rotated by 90° relative to each other. The receiving radiation 1-E reflected at the splitter 5 is incident on the fourth configuration means K4 provided this is implemented as shown in FIG. 2, and the receiving radiation modified by the means K4 is incident on the receiver 3 as radiation $S_{RR}$ to be detected by the receiver 3.

As FIG. 2 shows, additionally or alternatively, also the following configuration means can be provided or configurations can be produced:

configuration means K1 (first configuration means) in/on retroreflector or as retroreflector (see in particular subsequent description).

configuration means K5 in/on receiver 3 (see in particular subsequent description).

configuration means K6 which images here the incidence of the radiation $S_e$ on the reflector 2 and/or of the radiation 1-S on the configuration means K2 by means of a camera (see in particular subsequent description).

The inner construction of the receiver 3 depends upon the measuring task to be achieved. In the simplest case of a point sensor for detection of decorative defects, it can concern a photodiode or a photomultiplier. However, it can also follow the illustration 20.6 from STT3 (see in this Figure the beam course to the right of that non-polarisation-changing beam splitter on which the broken-line radiation termed "entry beam" is incident.

The precise optical properties (transmission, reflection, polarisation properties, etc.) of the optical elements in FIG. 2 can be optimised within wide limits for the measuring task to be achieved. In general, they need merely be sufficiently precisely known for a satisfactory solution to the problem so that they can be taken into account correspondingly in the evaluation of the signals.

FIG. 2 therefore shows, by way of example, the configurations K1 to K6 according to the invention for optimal adaptation of a retroreflex sensor system to a measuring task or for extended characterisation of samples in the example of a point measuring system. The following additional configurations according to the invention can thereby be used:

K1: actuator for moving the retroreflector.
K2: additional optical element which changes the polarisation, direction or the intensity of the radiation.
K3: modulator or switch for the polarisation state, the wavelength, the coherence or the radiation direction of the illumination.
K4: one or more optical elements for changing the polarisation and/or for spectral splitting of the receiving beam path and/or for selecting the wavelength of the detector (e.g. AOTF).
K5: extended detector which determines the Jones vector or the complete Stokes vector of the incident radiation—also without subsidiary condition due to the coherence or complete polarisation—and possibly diffractive elements for spectral splitting, and also point, lines or surface sensors.
K6: additional sensor for determining the object geometry or the angle of incidence of the radiation relative to the object surface and/or of the angle of rotation of the sample surface relative to the detector preferential direction and/or of the height of the examined sample surface.

Figure 3:
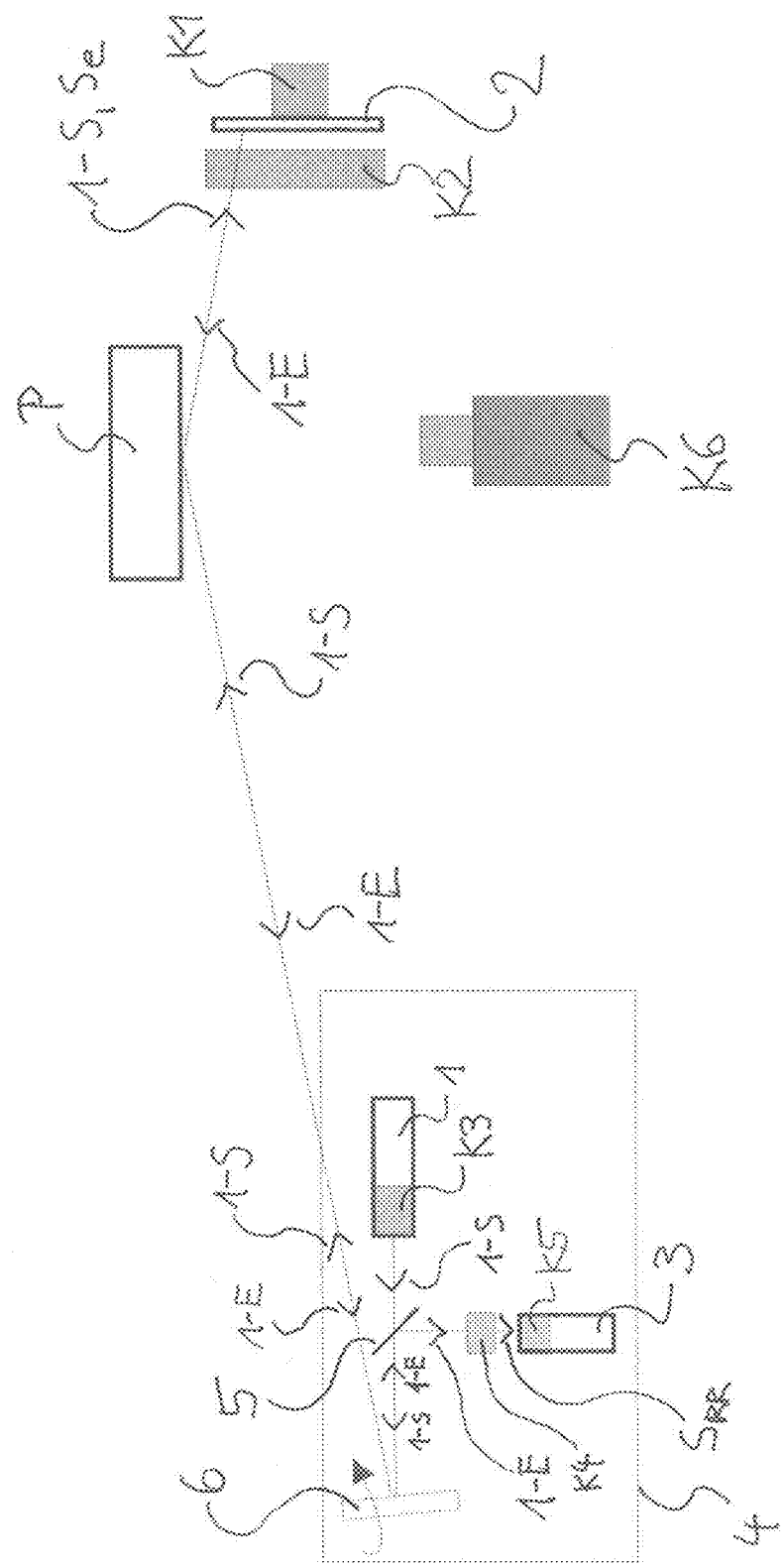
FIG. 3 shows an alternative system according to the invention which is constructed basically as shown in FIG. 2.

FIG. 3 shows an alternative system according to the invention which is constructed basically as shown in FIG. 2 so that subsequently only the differences are described. There are shown a transceiver (i.e. transmitter 1 and receiver 2 in the same housing 4) which is equipped with a deflection unit (here e.g. comprising a moveable, here: rotatable, mirror 6) and scans the object P linearly or line-wise.

In FIG. 3, a camera is provided and illustrated as configuration means 6 which images the incidence points of the illuminating radiation on the sample. With the help of the known beam direction of the transceiver, the height of the observed object points can be determined from the imaging of the incidence points. In combination with determination of the incidence points of the beam path on the retroreflector (for example by means of a camera which is disposed as K6 in FIG. 2), or an ellipsometric determination of the beam angles in the sensor itself, in addition a measurement of the surface geometry of the sample can be effected.

In FIGS. 2 and 3 (this applies also for the other Figures), any possibly present optical systems for imaging or for forming the beam course (e.g. lenses or mirrors for producing a special scanning or imaging) are not illustrated.

The transmitter or laser 1 can thereby have the following properties: basically retroreflex sensor systems can be produced in the entire range of the electromagnetic radiation. The only condition is that there are, in the respective range, suitable retroreflectors, detectors and "optical" elements with suitable properties (beam splitting, polarisation, refraction or reflection). Obvious embodiments operate in the visible or spectral range adjacent thereto. In preferred embodiments, for example a white light source, one or more lasers or a broadband IR- or UV light source can be contained in the transmitter or be coupled via a lightguide fibre into the transmitter. The receiver can comprise one or more photodiode(s), one or more line sensors, photomultipliers, . . . .

Suitable samples transmit or reflect (reflectively, i.e. according to the rule of reflection) a sufficient proportion of the incident radiation. Very well suited samples are for example optical (also coated) elements, metals, preferably thinly coated materials, solar cells, nanoimprints.

For clarification of the advantageous effects of the individual configurations or configuration means K of these configurations, they are explained subsequently, by way of example, with application cases.

IV.2. The Individual Configurations which can be Achieved Independently of Each Other or Together and Also Application Cases Therefor IV.2.1. Configuration K1

According to the invention, means K1 can be provided in order to move the retroreflector 2 during measurement. This can be effected by means of a rotational movement or a vibration of the reflector. The movement can be caused by an actuator as means K1. The actuator can concern for example a motor or vibrator which runs freely or is driven optimally for achieving the measuring task.

Figures 4A, 4B:
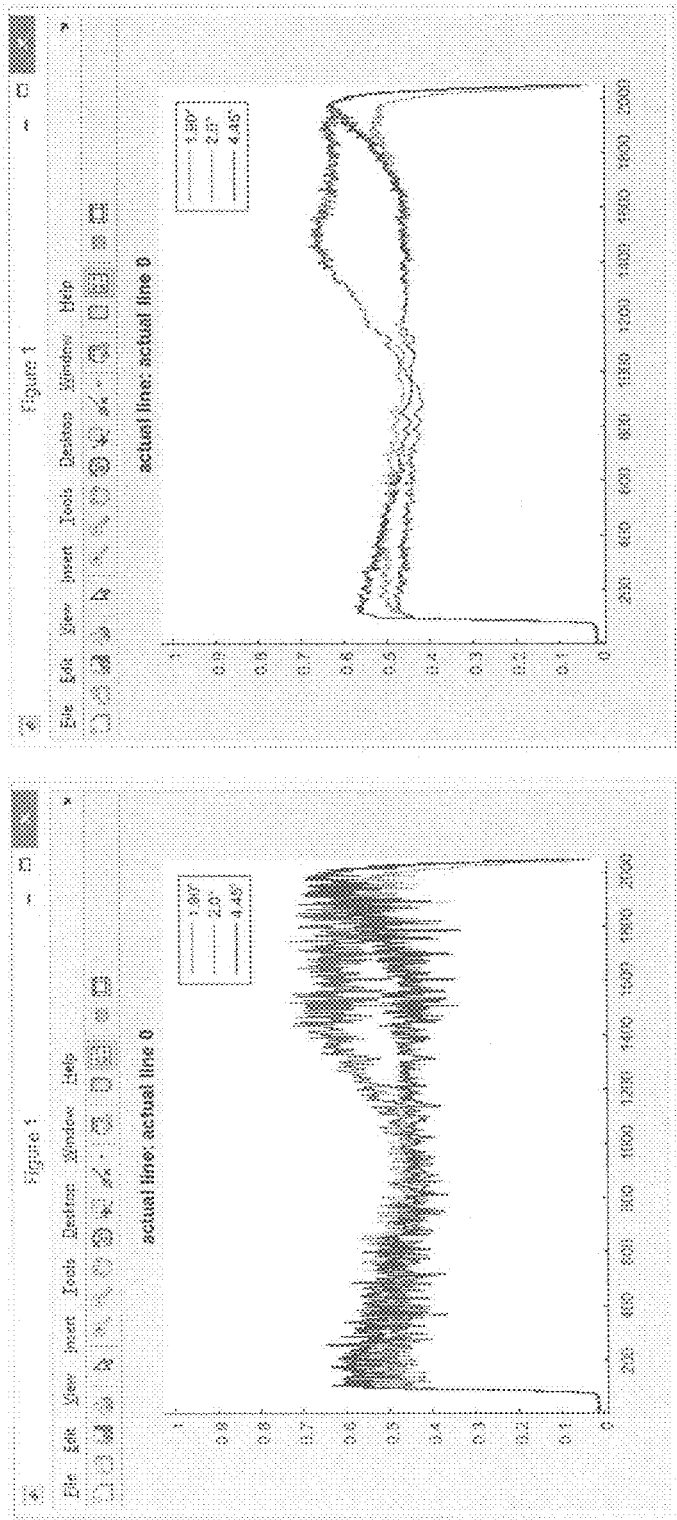
FIG. 4A-4B show a first advantageous effect of this configuration.

The movement can be implemented for example by rotation or vibration in order to minimise the noise of the measured signals by a microstructure of the reflector 2. FIG. 4A shows a first advantageous effect of this configuration. The measuring curves shown in FIG. 4A were recorded in a construction according to FIG. 3. A polygonal mirror was used as means for deflection (6 in FIG. 3) so that the sample was scanned in lines over time. With 3 a detector (here e.g. comprising three individual detectors), the intensity course for three polarisation directions (90°, 0°, 45°) was recorded over time and synchronised with the beginning of the scanning of the sample such that the measured data can be evaluated as image signals (pixel=x axis of FIG. 4). FIG. 4A shows the signals of individual image lines which were recorded without movement of the reflector. In contrast, FIG. 4B shows the result of an evaluation in which individual image lines were recorded with a moving reflector and were determined, in a pre-processing step, suitably such that FIG. 4B represents the course of the average values of the intensities over the image line.

As FIG. 4A-4B show, an optimised recording method for the purpose of configuration K1 can comprise averaging of the measured signals which is adapted both to the measuring task and to the movement of the reflector.

FIG. 4A-4B therefore show the improvement in the signal-to-noise ratio by configuration K1 by means of the signal comparison without configuration K1, i.e. with static reflector (left) relative to a reflector 2 moved according to K1 with averaging of the signals adapted thereto (right, b).

In embodiments of the invention in which according to configuration K2 (see subsequently) a reflector 2 producing this configuration K2 (which changes e.g. the polarisation of the incident radiation in a known dependency of the incidence location or angle of incidence) or a reflector 2 together with a reflector-external element producing this configuration K2 is used, the movement can also be controlled specifically such that consequently a modulation of the detected radiation is effected with a signal, from which the angle of incidence of the measured signal on the reflector surface or the geometry of the test piece P can be calculated in an evaluation unit of the system (not shown). This can be achieved for example with an actuator which receives a reference variable which brings the reflector for example into a position or angle position dependent thereon.

IV.2.2. Configuration K2

According to the invention, optically effective means K2 can be brought between sample and reflector. Examples of this are delay elements, optical rotators, attenuators. These can also be changeable (for example specifically controllable or rotatable or tiltable) so that their optical effect can be changed and, in the determined measured signals, leads to modulation with a desired or evaluatable signal component.

In some embodiments of the invention, K2 can also concern a coating of the retroreflector 2 itself, for example a layer which acts as quarter-wave delayer.

Further embodiments of the invention can concern a specific construction of a retroreflector 2 itself by correspondingly orientated microstructures.

In addition to retroreflectors (subsequently also termed, partially abbreviated, as "reflectors") consisting of microballs, reflectors consisting of microprisms can be used in further embodiments. These microprisms generally consist of three metallised planes which together form respectively a 90° angle. The metallised planes can either be triangular or square. In addition to the lower beam divergence or higher intensity, these reflectors have polarisation-changing properties—in contrast to reflectors with microballs. With suitable choice of the microstructure, the multiple reflection on the micromirrors effects a polarisation change of the incident light which is dependent both upon the angle of incidence and upon the angle of rotation of the retroreflector or of the microelements and can be determined with a mathematical model. If in the case of different angles of rotation of the retroreflector, a plurality of photos are taken, then it is possible to calculate directly both the rotation of the sample with respect to the camera coordinate system and the angle of incidence. This is independent of the examined sample as long as the layer structure consists of isotropic materials. After calculating the angle of incidence and angle of rotation for each image point, the further model parameters, such as refractive index and layer thickness, can be calculated with conventional methods of ellipsometry since the surface normal is known.

IV.2.2.1. First Example for Configuration K2

An example of the configuration K2 is the suppression of polarisation effects during reflection of the beams on the sample P.

The common effect of configuration K2 can be described with the Müller formalism. In this examination, the common effect of a separate, reflector-external configuration means K2, on the one hand, and the retroreflector 2, on the other hand, is described by a resulting Müller matrix $M_{res}$ as $M_{res}=M_{back} M_{reflector} M_{towards}$. $M_{towards}$ is thereby the Müller matrix for the optical path of the radiation 1-S from the sample P through the element K2, $M_{reflector}$ is the Müller matrix of the reflector 2 and $M_{back}$ is the Müller matrix for the return path of the radiation 1-E back through the optical element K2 towards the sample P.

For suppressing polarisation effects during reflection of the radiation on the sample P, the optical element K2 is coordinated to the properties of the retroreflector 2 such that $M_{res}$ comes as close as possible to the Müller matrix which is optimal for this application case.

$$M_{res,optimal} = \begin{pmatrix} 1 & 0 & 0 & 0 \\ 0 & 0 & 0 & 0 \\ 0 & 0 & 0 & 0 \\ 0 & 0 & 0 & 0 \end{pmatrix}$$

In this optimal case, polarisation effects during the reflection on the sample are eliminated or at least minimised. Hence this configuration is for example ideal for recognising decorative defects on coated or enameled surfaces. The disruptions to the reflectance caused by these defects is superimposed there otherwise, possibly by polarisation effects and cannot be reliably differentiated from these.

As optically effective means for this application case, K2 can concern a depolariser or a depolarisation coating of the actual reflector.

Also for applications in which structure edges of the test piece P or interface courses in the test piece are intended to be determined, the advantage is gained in this configuration that polarisation signals which otherwise superimpose and falsify the measured signal are eliminated.

IV.2.2.2. Further Examples of Configuration K2

A further example of an application of this configuration is illustrated in FIG. 5A-5B. FIG. 5A-5B show alternative systems according to the invention which are basically constructed as shown in FIG. 2 so that subsequently only the differences are described. The first difference is that the example systems shown in FIGS. 5A and 5B concern transmission systems.

In addition, the transmitter 1 transmits circularly polarised light in this case. The receiver 3 detects the light which is polarised circularly in the opposite direction. The means K2 according to the invention concern here an element in the form of a (rotated in any manner relative to the optical axis) half-wavelength plate or half-wavelength film. The common detection unit in the housing 4 can be constructed either as shown in FIG. 5*b* (with beam splitter 5 and separate production of the polarisation of illumination 1 and detector 3) or as shown in FIG. 5*a*. There, a polarising beam splitter is used. The radiation coming from the light sources is then polarised linearly and, after passage through the quarter-wavelengths ($\lambda/4$) delay element 7, the radiation is polarised circularly. The receiver beam path passes through the same element 7 towards the polarising beam splitter 5 so that element 7 in total (over the entire beam path) leads to a delay of half a wavelength ($\lambda/2$).

In both construction variants, the sensor 3 detects a signal which is proportional to $\cos^2(\Delta)$ with the sought delay $\Delta$ in the sample.

In further embodiments of the invention, the means or element K2 can have a modulatable or displaceable configuration and allows additional or better measurements for characterisation of the sample. In other embodiments of the invention, K2 is connected as optical element rigidly to a rotatable reflector 2 according to configuration K1, for example as coating of the reflector 2 or as a separate optical element rotating with said reflector.

As example of application with a rotating optical element K2 (without restriction to this embodiment), the retroreflex transmission arrangement according to FIG. 5*b* is considered. It consists (or comprises the following elements) of the receiver 1 which emits circularly polarised light, the receiver 3, which detects, on one channel, the intensity of the circularly polarised radiation incident thereon and a quarter-wavelength plate or -film K2 which rotates with the polarisation-obtaining retroreflector 2 according to the invention.

If a retroreflector 2 without beam offset is used, the receiver 3 detects, even in the case of objects P with high refractive indices, an intensity signal I which has the following characteristic:

$$I = 0.5 \cos[2(\alpha-\theta)]^2 \sin[\Delta]^2$$

with the angle $\alpha$ of the direction of the (possibly voltage-induced) delay in the sample, the angle of rotation $\theta$ of the quarter-wavelength plate or -film and the delay or voltage-induced phase shift $\Delta$ on the beam paths through the sample P.

For this embodiment, the delay plate K2 can rotate alone or together with the reflector 2. In other embodiments of the invention, a modulatable delay element is used as K2. The angle $\theta$ is changed by modulation in these cases.

FIG. 5A-5B show therefore examples of systems or sensors with optical elements or configuration means K2 between sample P and reflector 2. In FIG. 5A, the optical element K2 is fitted alone, in FIG. 5B the element K2 is connected rigidly to the reflector 2 and is moved (by means of K1) together with the reflector.

In the mentioned examples, a polarisation-obtaining retroreflector is used. The circular polarisation of the transmitter beam path is achieved either by using a circularly polarised radiation source 1 and a non-polarising beam splitter 5 (see FIG. 5*b*) or by using a polarising beam splitter (5 in FIG. 5*a*) together with a delay element (7 in FIG. 5*a*).

IV.2.3. Configuration K3

By modulation of the polarisation state of the illumination 1 with at least two different states by a modulation means or -element K3 in the transmitter beam path 1-S, it becomes possible to determine, in addition, the angle of inclination of the sample surface relative to the optical axis. In the case of systems or sensors according to the invention with scanning of the sample surface (e.g. laser scanner), determination of the angle of inclination for each image point or each pixel can be effected hence separately. An example of such a modulation is the modulation of the illumination 1 such that radiation which is polarised alternately left-hand circularly and right-hand circularly is emitted. For this purpose an electronically adjustable delay element K3 is fitted in the transmitter beam path 1-S, e.g. directly beam-output-side of the transmitter 1 (cf. FIG. 6*a*).

As an alternative thereto (cf. FIG. 6*b*), a further light source 8 with the same emission wavelength $\lambda$ as the transmitter 1 (or with an emission wavelength deviating generally merely slightly from $\lambda$ of the transmitter 1) can be disposed in the second light path 1-S2 of an introduced polarising beam splitter 9. (The radiation of the source 8 or of the light path is coupled into the light path 1-S1 of the transmitter 1 via the beam splitter 9 to form total radiation 1-S on the beam-output side of the splitter 9). In the transmitter beam path 1-S behind the splitter 9, i.e. between the polarising beam splitter 9 and the object P (not visible here), in addition a quarter-wavelength- or $\lambda/4$ delay element 10 can be disposed.

Figure 6B:
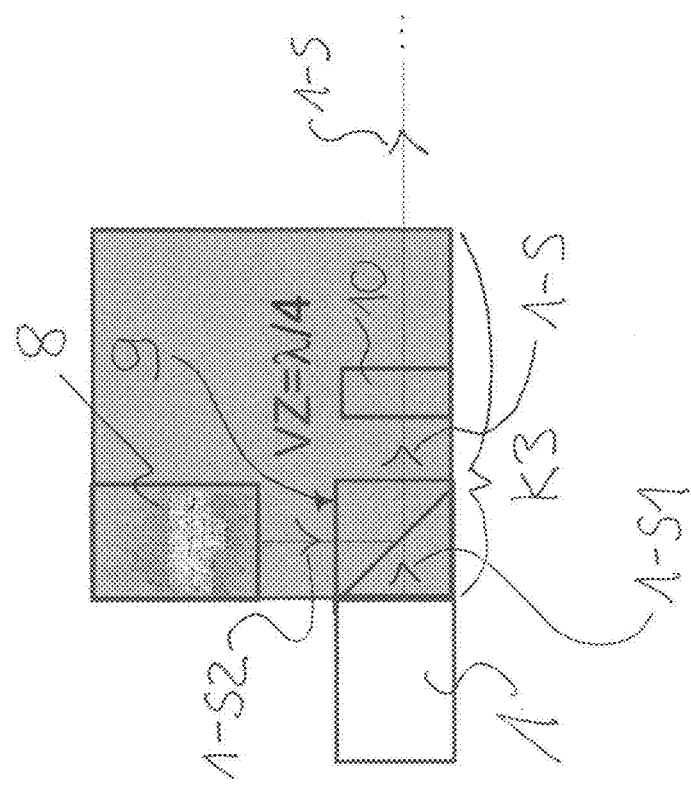
FIG. 6A-6B shows two embodiments of a circularly polarised illumination modulation (according to K3) by means of a polarised transmitter 1 and a modulatable or rotatable delay element K3 (FIG. 6A) or, equivalently thereto, by a means K3 comprising an additional beam source 8, a polarising beam splitter cube 9 and a fixed delay element 10 (FIG. 6B).

The modulation is produced in FIG. 6*b* by the light sources 1 and 8 being switched on alternately. For example, within the scope of the present invention, a laser scanner according to STT1 can be used (e.g. according to the construction shown there in FIG. 2, 3 or 7) as transceiver or as combined transmitting- and receiving unit (i.e. as transmitter 1 plus receiver 3 in the common housing 4). If the receiver 1 of the transceiver 1, 2, 4 can determine at least the components U and V of the incident radiation which has a Stokes vector {S, U, V, W}, then, from these measured values of the linear polarisation components of the Stokes vector, the angle φ of each measured or image point of the sample P relative to the preferential direction of the detector can be calculated. During measurement of isotropic samples, the angle φ is the rotational position of the surface normal of the sample relative to the preferential direction of the detector (directions of the U polarisations). The values U[W+] and V[W+] of the detector are determined in the case of positively circularly polarised illumination. The values U[W−] and V[W−] are determined in the case of the oppositely directed circularly polarised illumination. In these terms, the determination equation for the angle φ is given by:

$$\tan(2\phi) = \frac{V[W+] + V[W-]}{U[W+] + U[W-]}.$$

Hence, ellipsometric measurements can be corrected with the arrangement and a rotational position of the object or of each object point relative to the sensor coordinate system can be determined.

Provided the illumination beam path 1-S is modulated in the wavelength λ, the system can record the optical properties at several spectral measuring points and thus—in the manner known per se according to the state of the art for individual-point measuring devices—a plurality of support points in the case of the model-assisted measurement of samples P, can be obtained. In the case of one- or two-dimensionally operating (imaging) sensors or systems, likewise a wavelength modulation can be implemented. The modulation is effected in this case synchronously to obtaining partial images—for example line-wise, image-wise or in a fixed pixel raster.

The wavelength modulation can be combined with the modulation according to the invention of the polarisation state of the illumination 1. In an advantageous embodiment of this combination, the two light sources 1 and 8 of FIG. 6b (respectively as laser) emit different wavelengths with a spectral spacing which is respectively small in comparison with each of the two wavelengths of the lasers.

Figure 6A:
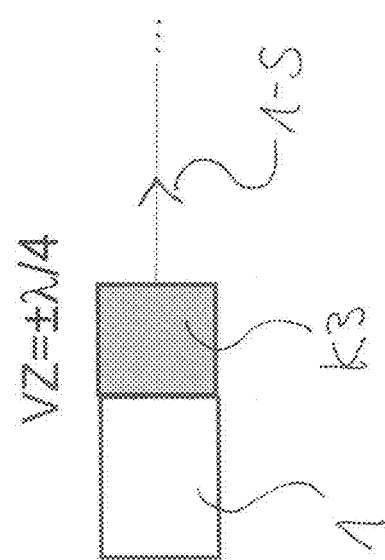

FIG. 6 shows FIG. 6A-6B show therefore two embodiments of a circularly polarised illumination modulation (according to K3) by means of a polarised transmitter 1 and a modulatable or rotatable delay element K3 (FIG. 6A) or, equivalently thereto, by a means K3 comprising an additional beam source 8, a polarising beam splitter cube 9 and a fixed delay element 10 (FIG. 6B). In the embodiment shown in FIG. 6B, the modulation is effected by switching over or switching on and off of the two light sources 1 and 8.

IV.2.4. Configuration K4

By means of the measurement in retroreflection, the optical properties of the measured object P enter quadratically into the measured signals (by multiplication on the path 1-S via/through the sample P to the reflector 2 and on the path back 1-E from the reflector 2 via/through the sample P). Whilst the ellipsometric characteristic variables Δ and ψ enter as arguments of angle functions into the measured variables in systems with simple reflection, they enter with comparable retroreflex measuring systems with a pre-factor 2. Correspondingly, the retroreflex systems have a region which is only half as large and in which these variables can be determined unequivocally. Furthermore, according to the embodiment of the system, the measuring precision for determination of the variables Δ and ψ with the absolute value thereof can vary greatly.

According to the invention, a fixed, adjustable or modulatable optical means or element (delay element and/or dichroitic element) is disposed for solving these problems in configuration K4 in order to adapt the unequivocal ranges of the measurement optimally to the value ranges of the respective samples of interest which are to be measured.

If, corresponding to configuration K4, for example an additional delay element is introduced directly in front of the receiver 3 into the receiving beam path 1-E (i.e. in the housing 4, in 1-E beam-output-side of the splitter 5, i.e. between the splitter 5 and the receiver 3), then the unequivocal measuring range of the system can be adapted to the range of the samples to be measured.

Figure 7:
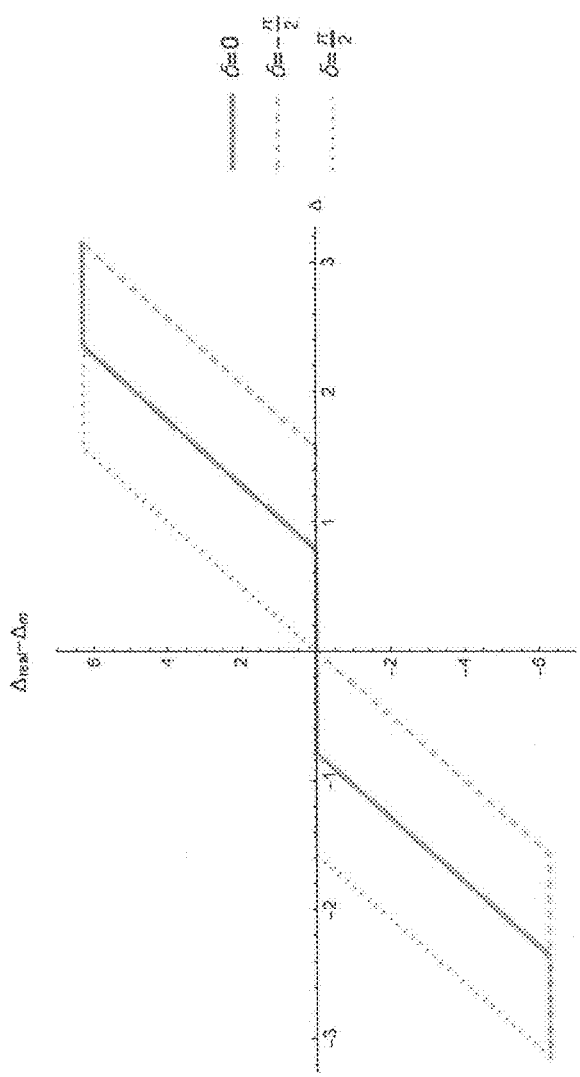
FIG. 7 shows the unequivocal ranges ($\Delta_{real}-\Delta_m=0$) of determination of A for different phase shifts $\delta$ of an additional delay element (as means K4) in front of the receiver 3.

FIG. 7 shows this for determining the phase shift Δ with a retroflex ellipsometer for a delay element which is introduced according to configuration 4 or as K4 and is adjusted, in the illustrated example, to a phase shift of δ=−π/2, δ=0 or δ=+π/2.

According to the application case, the delay element can be introduced set rigidly in the beam path, as variable element (e.g. electrically actuatable) or can be pivoted into the beam path.

Further embodiments of configuration K4 according to the invention can modulate the variables Δ and ψ and can determine more precise or additional measured values with a corresponding evaluation method.

FIG. 7 therefore shows the unequivocal ranges ($\Delta_{real}$−$\Delta_m$=0) of determination of Δ for different phase shifts δ of an additional delay element (as means K4) in front of the receiver 3.

IV.2.5. Configuration K5

Additional object information about P can be obtained if the system or the detector 3 thereof determines all four Stokes parameters at the same time. This can be effected for example by extending the detector of a retroreflex sensor to form a "Division of Amplitude Photopolarimeter" (e.g. according to [STT5]). As an alternative thereto, the detector of a retroreflex sensor can be replaced by a corresponding detector.

If for example the detector of a retroreflex sensor according to STT1 is correspondingly extended and used within the scope of the present invention, then it can be examined by means of the measured values themselves whether the object P or each image point of the object P is depolarising or not. Provided no depolarisation is established, a more extensive ellipsometric examination of the anisotropy of the sample can be effected.

In the case of the present invention, also additional light sources can be introduced into the optical path. These light sources can be disposed in addition or alternatively to the light source(s) in the transmitter part 1. In the case of corresponding configuration of the arrangement, this allows determination of the complete Müller matrix of each examined object point in a retroreflex arrangement.

IV.2.6. Configuration K6

For precise ellipsometric measurements—for example of the thickness of coatings or enamels—the knowledge of the angle of incidence of the radiation on the sample P is necessary—both in the reflection plane and also relative to the beam axis or preferential direction of the detector 3.

In many cases, this information is present or in principle accessible (for example in the case of planar objects P which are guided precisely through the measuring field or in CAD data). Provided the object geometry is derived from CAD data (one of the possibilities for a configuration means K6), the evaluation unit of the system must compare the CAD data with the movement of the object P through the measuring field and prepare the associated angle information from data of the movement of the object through the measuring field (movement data) and the CAD data for each measuring point.

The simplest case for such a comparison is the movement of the object at constant speed through the measuring field. With this pre-condition, only one trigger signal need be initiated when the movement of the object through the measuring field begins and the speed of the movement must be known. Then the CAD data can be compared directly with the image data. Otherwise, signals (movement data e.g. from a motor control for the movement of the object P or additional position sensor signals, etc.) must be provided, which only then make possible this comparison.

In cases in which the beam angles are derivable neither from the measured values themselves nor from external data sources, the beam angles must be measured in addition for extended characterisation of the optical properties of the object P (or of image points of the same). In a simple manner, this can be effected by imaging of the measured point on the object P (cf. camera K6 in FIG. 3) and/or imaging of the point of incidence of the radiation 1-S or $S_e$ on the reflector 2 (cf. camera K6 in FIG. 2). Alternatively thereto, also an additional measuring system can be disposed which determines, with methods according to the state of the art (e.g. mechanical scanning, triangulation, deflectometry etc.), the inclinations of the surface of P (relative to the guidance or position).

IV.2.7. Further Configuration Means According to the Invention

For extended or improved evaluations of the measured values, it is advantageous to provide configuration means, with the help of which the measured intensity values can be standardised in fact to the lowest stage of evaluation. These can be integrated in the common housing 4 or fitted in the region outside the same.

Embodiments, by way of example, for this are:

For systems with laser scanners (e.g. according to STT1), a further retroreflector (or a combination of a further retroreflector with optical means, such as neutral filters or polarisation-changing optical components) can be disposed in the housing 4 such that a part of the scan line is reflected back directly into the receiver 3. This is always possible when the complete scan line is required for detecting the sample P. In this case, variations in the illumination 1 or in the sensitivity of the detector 3 (or detector parts of the same) can be compensated for by the standardisation.

In transmission systems according to the invention with laser scanners (e.g. according to STT1), a region of the retroreflector 2 which is not covered by the object P can be used for standardisation. With this standardisation, additional variations of the measured intensities which are produced outside the housing 4 can be compensated for (e.g. fogging of the retroreflector 2).

In reflection systems according to the invention, one or more reference object(s) can be disposed next to the sample P for corresponding standardisations with the same advantages (possibly additionally) such that a part of the illumination 1 is reflected on this/these reference object(s) and the reflected beams are incident on the retroreflector 2.

IV.3. Combinations, by Way of Example, of Configurations According to the Invention

IV.3.1. First Combination Example

The consistent overall concept of the invention is now illustrated with the example of a universal system for improved classification and characterisation of objects P or points of the object surface. It is thereby clarified that the addition of each individual described configuration (e.g. several or all of the configuration means K1 to K6) causes an improvement which represents in fact a sufficient or even the optimal solution for defined measuring tasks.

The combination example is based on an imaging retroreflex laser scanner according to the basis construction in STT1 which is extended, according to the invention, by corresponding (additional) configuration means to form a comprehensive system for classification of samples with respect to decorative defects, material defects, type of material, the coating and coating defects. With this system, all ellipsometric parameters—even on uneven surfaces and also in many manufacturing processes—can be determined. To date, these parameters have often only been able to be determined in the laboratory on flat regions of samples by means of ellipsometry.

The basic construction from STT1 uses the retroreflection of the radiation reflected on the sample: the beams, after reflection on the object surface of P, are incident on a retroreflector 2. In the case of reflectors 2 without beam offset, the beams are reflected back into the combined transmitting and receiving unit 1, 3 and 4 on precisely the same optical path. Therefore with this system concept, signals of the examined samples P which can be evaluated in a wide angle range are obtained. (In contrast thereto, in the case of conventional ellipsometers from the state of the art, in fact small angle deviations of the order of magnitude of 1° in the case of components and sample in the plane of incidence lead to no evaluatable measured signal being detectable).

With the basic construction from STT1, decorative defects in the samples can be recognised as local disruptions to reflectance.

Provided such a system according to the invention is extended with configuration 1 by a moving reflector 2, the signal-to-noise ratio can be improved. Hence the detection of finer or weaker local surface disturbances is correspondingly improved.

Provided the detector 3 of such a system according to the invention is extended corresponding to configuration K5 (the combination K1 and K5 is therefore present) such that also the degree of polarisation of the radiation is detected, then in fact a rough classification can be implemented for each image point or imaged point of the sample, according to the criteria:

depolarising with simultaneous determination of the degree of (de)polarisation.

the object P (or the object point) has a purely circularly anisotropic Müller matrix.

the object P (or the object point) shows no phase shift.

the Müller matrix of the object P or object point shows linear or mixed linear and circular anisoptropy.

For objects without phase shift, in addition the angle of rotation relative to the optical axis of the sensor can be determined. Furthermore, the reflectance R (in reflection arrangements) or the transmission coefficient T (in transmission arrangements) and the ellipsometric parameter ψ for these objects can be calculated from the measured values. In many cases, the refractive index and the extinction coefficient can be determined therefrom. Provided only these variables are to be determined for these objects, the optimal solution to the problem is already achieved at this point.

A further characterisation of the samples (-measuring points) is possible with the combination K1 with K3 and K5. If the sample P is correspondingly illuminated alternately with left-hand and right-hand circularly polarised light, then—independently of the type of object—the angle of rotation of a sample anomaly relative to the sensor coordinate system (i.e. the receiver coordinate system) can be determined for each pair of image points. From this information and the further measured values, in addition it can be determined unequivocally whether the Müller matrix of the associated point of the sample has purely linear anisotropy. For each object point with a Müller matrix with purely linear anisotropy, in addition the ellipsometric variables R or T, Δ and ψ can be calculated. Anomalies, such as local coating defects or material defects, can thus be detected as local disturbances, even if they are concealed possibly from the human eye. If, according to K3, the modulation is produced by switching over of two light sources 1 and 8 which emit spectrally with a small interval, in addition the complex refractive index of the associated point of the surface can often be determined for each image point of a substrate P.

For improving and/or adapting the measuring precision or the unequivocal range for the evaluation, an optical element can in addition be disposed directly in front of the sensor, according to configuration K4 (then the combination K1 with K3, K4 and K5 is present).

A further improvement in the precision of the system is possible, furthermore, if more precise values of the angle of rotation of the sample and/or of the angle of incidence according to configuration K6 from external data sources are used (then the combination K1 with K3, K4, K5 and K6 is present).

In another embodiment of such a system, a spectrally broadband light source can be used, in combination with a diffractive optical element in front of the receiver beam path (according to configuration K4). In this case, it is advantageous to implement the modulation of the illumination with a modulatable delay element (according to configuration K3) and to use line sensors as detectors in the receiver. In this embodiment, the spectral course of the ellipsometric characteristic variables during a polarisation are obtained at any time in the scanning of the surface. By means of scanning the measuring point at least twice with differently polarised illumination, pairs of spectra are obtained, from which the properties of the object point and also the angular position thereof can be derived with the methods of spectroscopic ellipsometry.

The configuration combinations were described here, by way of example, starting from the basic construction of STT1 (i.e. described as extensions according to the invention of systems according to STT1), i.e. for systems which operate in reflection. For systems which operate in transmission, the embodiments apply analogously. If required, individual configurations can also be omitted.

IV.3.2. Second Combination Example

For this example, a retroreflex sensor is extended as follows (e.g. system according to the invention according to FIG. 2, at least K2 and in addition K3 of the configurations being provided):

The optically effective means K2 (between object P and a polarisation-obtaining retroreflector 2) is a quarter-wave delay element rotating with the angular speed ω.

In addition, according to K3, an alternating left-hand and right-hand circular illumination is chosen, which is modulated rapidly compared with the angular speed ω.

FIG. 8a shows such an embodiment of the invention in transmission arrangement with a light source which is disposed next to the detector and determines the ellipsometric characteristic variables in transmission. Transmitter S and receiver E can thereby be produced as point-, line- or surface-illumination and detector.

In a particularly advantageous embodiment of this concept according to the invention, the delay element K2 is coupled rigidly to the retroreflector 2 (for example as coating or film applied thereon) and rotates in addition, according to K1, together with the latter. In this case, an additional improvement in the signal-to-noise ratio can be achieved at the same time.

FIG. 8b shows such an embodiment for determining the characteristic variables in reflection with a rotatable retroreflector 2 according to K1. In an advantageous embodiment, the optical element K2 is connected directly to the reflector 2.

FIG. 8A-8B hence show two embodiments of retroreflex ellipsometers according to the invention for determining the ellipsometric parameters independently of the sample adjustment.

Figure 9:
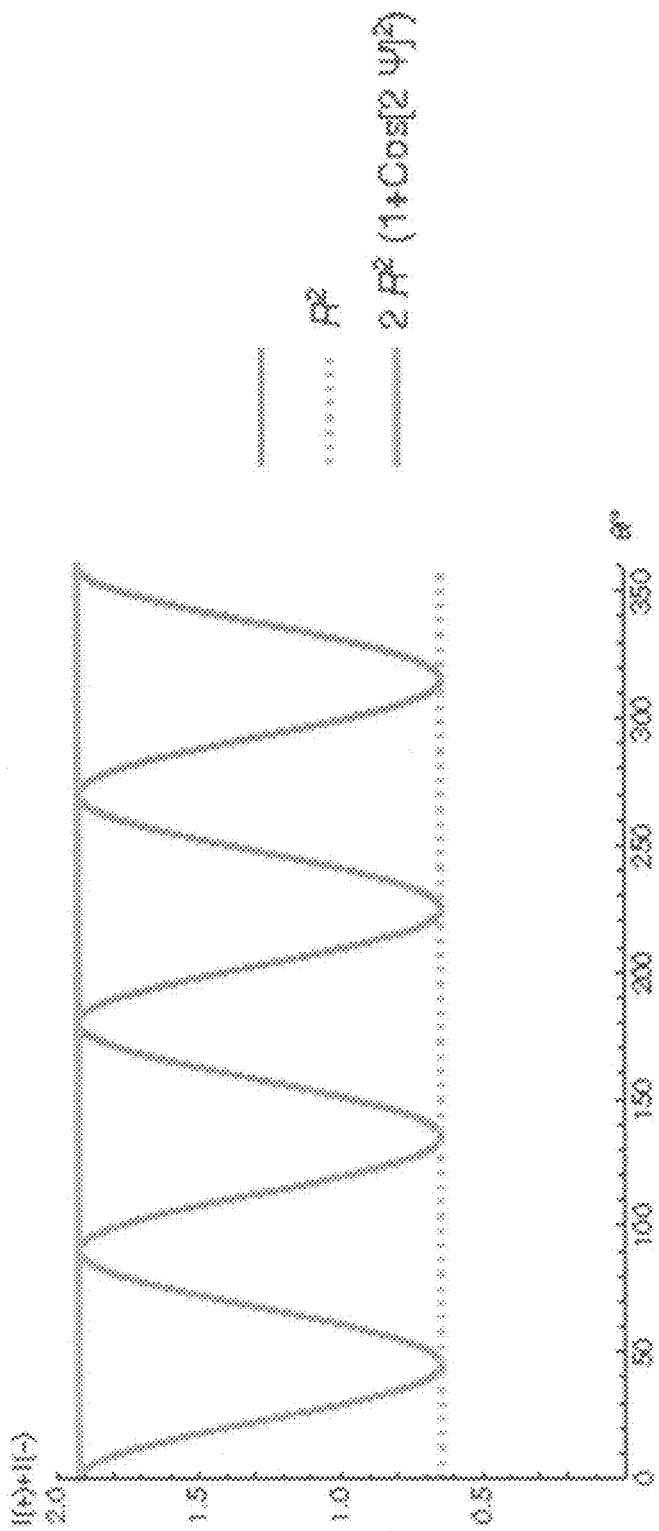
FIG. 9 shows the measured signal which is produced with an embodiment with a single-channel intensity detector during a rotation of the delay element K2.
Figure 10:
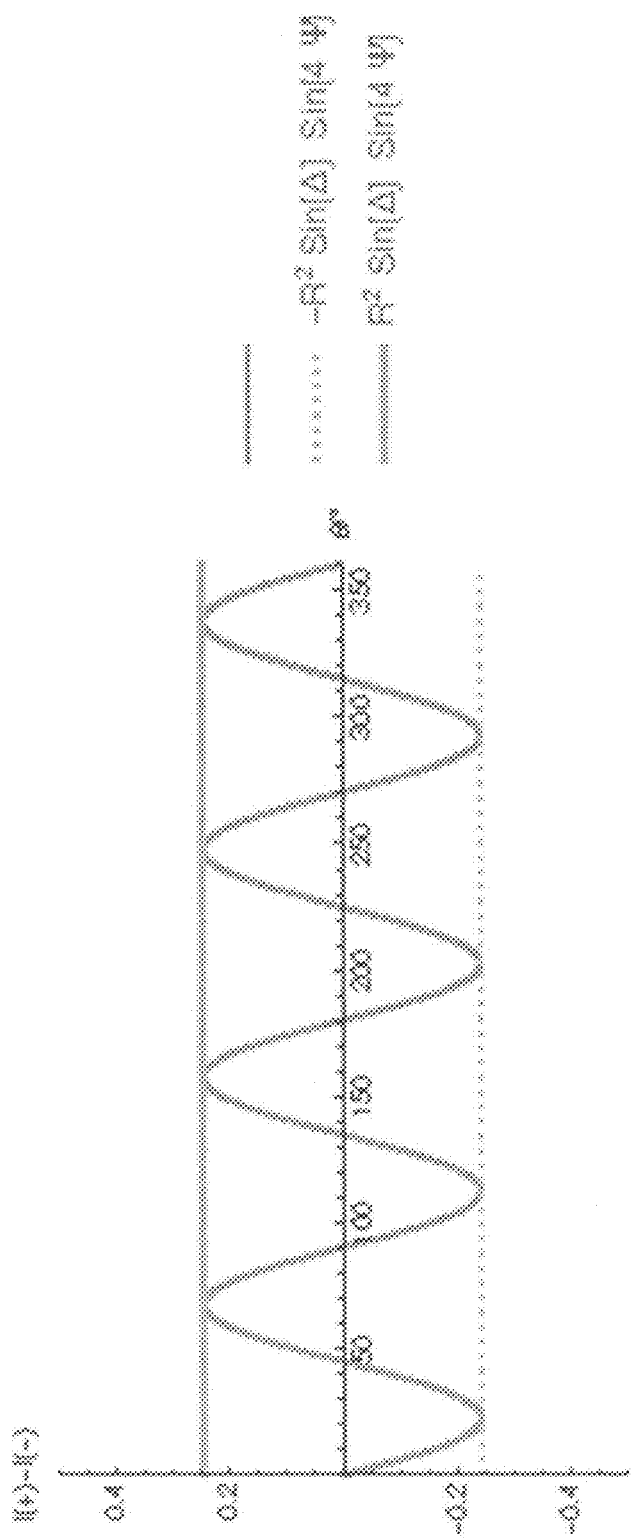
FIG. 10 shows the measured signal which is produced with an embodiment with a single-channel intensity detector during a rotation of the delay element K2.

FIGS. 9 and 10 show (with respect to FIG. 8A-8B) the measured signal which is produced with an embodiment with a single-channel intensity detector during a rotation of the delay element K2. There are shown the sum (FIG. 9) and the difference (FIG. 10) of the intensity signals in the case of alternating left-hand and right-hand circular illumination. As this makes clear, the characteristic variables R or T, Δ and ψ can be derived from the signal courses in a simple manner. From the angular position of the maxima or minima, there follows furthermore directly the angle of rotation of the sample P (relative to the preferential direction of the delay element K2).

By additional configuration of a diffractive optical element in front of the receiver beam path (according to configuration K4) in combination with a linear white light source as transmitter and a matrix detector as receiver, a spectroscopic ellipsometer can be produced. This can be used for measuring objects which are not measurable with spectroscopic ellipsometers according to the state of the art.

V. (FURTHER) EMBODIMENTS OF THE INVENTION AND ASPECTS ACHIEVABLE ACCORDING TO THE INVENTION

The invention can be produced (also or in particular also) according to and/or using the following aspects. (The term "retroreflex sensor" is thereby used synonymously to "retroreflector-based sensor system".)

1. Retroreflex sensor for improved characterisation of the properties of a sample comprising
   a retroreflector,
   a transmitter which illuminates a point-like or one- or two dimensional region of a sample, preferably a point, a line or a surface of this sample, and
   a receiver (detector) which receives the radiation which is reflected back from the retroreflector and was reflected twice on the sample on the entire beam path or radiated through the latter twice,
   the optical axis in the illumination beam path of the transmitter and the optical axis in the receiving beam path to the detector, at least in portions, having therefore approximately the same direction and/or corresponding, and
   the light reflected on the sample and/or the light transmitted by the sample being reflected back by a retroreflector principally on the same optical path, for example when using a film reflector as retroreflector, or with a parallel offset.

("Principally" thereby means, according to aspect 1 and in the subsequent aspect 2, that the predominant proportion (in particular: radiation proportion or intensity proportion) of the light reflected on the sample and/or of the light transmitted by the sample is reflected back on the same optical path (for example when using the film reflector as retroreflector) or with a parallel offset).

2. Retroreflex sensor for improved characterisation of the properties of a sample comprising
- a transmitter which illuminates a spot or one- or two-dimensional region of a sample, preferably a point, a line or a surface of this sample,
- a receiver (detector), consisting of individual-detector element(s), line detector(s) in the embodiment as line array(s) or -sensor(s), or surface sensor(s) in the embodiment as surface array(s) or matrix sensor(s),
- the optical axis in the illumination beam path of the transmitter and the optical axis in the receiving beam path to the detector, at least in portions, having therefore approximately the same direction and/or corresponding, and
- the light reflected on the sample and/or the light transmitted by the sample being reflected back by a retroreflector principally on the same optical path, for example when using a film reflector as retroreflector, or with a parallel offset.

3. Retroreflex sensor according to aspect 1 or 2, characterised in that any two or more than any two of the following elements (additional elements) or configuration means are disposed and/or are present:
- an actuator for moving the retroreflector during measurement of the sample,
- an optical element between sample and retroreflector which changes the polarisation, the direction or the intensity of the radiation,
- a retroreflector which changes the polarisation, the intensity, the direction or the offset of the back-reflected radiation in a known manner,
- a modulation unit for modulating or switching the polarisation and/or the wavelength and/or the coherence and/or the radiation direction of the transmitter beam,
- one or more optical elements for changing the polarisation state and/or spectral splitting or selection of the entire receiver beam path which are disposed in front of the receiver beam path such that they do not affect the beam path for illumination of the sample,
- a detector, which detects the complete polarisation state of the radiation incident thereon, the detector being able to be configured as extension of a previous embodiment or replacing a previously provided or present detector,
- light sources in a plurality of partial beam paths of the receiver which are present in addition or instead of the transmitter S,
- a data source connected to the evaluation unit with geometric data of the sample from which, assuming a constant movement of the sample through the measuring field or by combination with signals which characterise this movement, the angle of incidence of the radiation on the sample and/or the angle of inclination of the sample relative to the detector coordinate system (about the optical axis) can be derived,
- a sensor or a plurality of sensors for determining geometric data of a sample or the position, situation or orientation thereof in the measuring field, and the sensor or the sensors are connected to the evaluation unit such that the angle of incidence of the transmitter radiation on the sample and/or the angle of inclination of the sample relative to the detector coordinate system (about the optical axis) can be made available in the evaluation unit,
- reference objects for automatic calibration of intensity- and/or polarisation measured values.

4. Retroreflex sensor for improved characterisation of the properties of a sample according to aspect 1, 2 or 3, characterised in that the actuator sets the retroreflector in a rotating or vibrating movement and means are provided in the evaluation unit for averaging the measured values and/or in that the actuator moves the reflector in a specific or controlled movement course such that, from a known structuring of the retroreflector, in conjunction with the movement thereof, additional information about the measured object can be obtained.

5. Retroreflex sensor for improved characterisation of the properties of a sample according to one of the aspects 1 to 4, characterised in that the optical element between measured object and retroreflector is configured as
- static or modulatable delay element, or
- static or modulatable polariser, or
- element which changes the intensity in a static or modulatable manner as function of the entry location or angle of incidence (e.g. as mask with partially absorbing points, lines or gratings), or is configured as element which implements a combination of these changes at the same time.

6. Retroreflex sensor for improved characterisation of the properties of a sample according to one of the aspects 1 to 5, characterised in that the retroreflector either
- is depolarising,
- or comprises a combination of polarisation-obtaining retroreflector and a static or modulatable delay element,
- or is constructed such that the polarisation state of the reflected radiation depends, in a defined manner, upon the angle of incidence or point of incidence of the incident radiation
- or the spectral function of the back-scattering coefficient of the retroreflector depends, in a defined manner, upon the angle of incidence and/or point of incidence of the incident radiation.

7. Retroreflex sensor for improved characterisation of the properties of a sample according to one of the aspects 1 to 6, characterised in that
- the additional modulation unit comprises switchable light sources which are coupled via optical elements, such as polarising, dichroitic or other beam splitters such that, when switching, the polarisation state and/or the wavelength and/or the coherence and/or the radiation direction of the radiation is changed,
- and/or modulatable optical elements for changing the polarisation, such as rotating or adjustable delay elements are integrated in the transmitter beam path,
- and/or elements for changing the radiation direction, such as modulatable mirrors, are integrated in the transmitter beam path.

8. Retroreflex sensor for improved characterisation of the properties of a sample according to one of the aspects 1 to 7, characterised in that optical elements are disposed in front of the receiver beam path without influencing the transmitter beam path, which optical elements
- change, statically or changeably, the overall delay of the radiation detected in the receiver,
- and/or change, statically or changeably, the dichroism of the radiation detected in the receiver, and/or change the receiver beam path in a direction spectrally in the position and/or direction (e.g. are configured as diffractive optical element), and/or select, statically or changeably, the wavelength of the radiation detected in the receiver.

9. Retroreflex sensor for improved characterisation of the properties of a sample according to the aspects 1 to 8, characterised in that the additional sensor(s) for determining geometric data of the sample or the orientation thereof in the measuring field is constructed according to one (or more) of the following features:

the radiation radiated from the transceiver and partially scattered on the sample surface or the surface of the retroreflector, for determining the geometry or the angle of inclination of the sample surface, is imaged on an additional sensor (e.g. camera), and/or points, lines or patterns are projected onto the object surface and imaged on a sensor (camera), and/or additional 3D sensors are disposed which operate according to a method according to the state of the art (e.g. mechanical scanning, deflectometry, strip projection or laser triangulation).

10. Method for improved characterisation of the properties of a sample, a retroreflex sensor according to one of the aspects 1 to 9 being used as follows:

implementing a first measurement of the Stokes vector of the received radiation and determination of the degree of polarisation for the measured region of the sample (point, line or surface) and also preferably also for regions without depolarisation.

11. Method according to aspect 10, a further characterisation of a/the Müller matrix of the associated object regions with respect to the type of anisotropy being effected in the anisotropy category (ies)

a) purely circularly anisotropically, and/or
b) without phase shift, and/or
c) purely linearly anisotropically or mixed linearly and circularly anisotropically.

12. Method according to aspect 11, furthermore for the Müller matrices of the regions from categories a) and/or b)

for regions from category a), the type and value of the circular anisotropy (circularly dichroitically and/or circularly double-refractively) being determined and/or for regions from category b), the value of the dichroism being determined and/or the angle of inclination or rotation of the anisotropy relative to the preferential direction of the detector being determined.

13. Method for improved characterisation of the properties of a sample according to one of the aspects 10 to 12, further comprising:

implementing a second measurement of the Stokes vector of the received radiation in which the polarisation state, alone or in combination with other parameters of the components (wavelength, coherence and/or adjustments at least of one of the configurations K2 to K4) is changed relative to the first measurement, and a mutual assignment of the first measurement and of the second measurement to pairs of measured results being effected for respectively the same regions of the sample, and preferably for this a further characterisation being effected of the Müller matrix with respect to at least one of the sub-categories c1) purely linearly anisotropically,
c2) mixed linearly and circularly anisotropically, preferably the type and value of the anisoptropy being determined, and/or with respect to the angle of inclination and/or of rotation of the anisotropy relative to the preferential direction of the detector and preferably of one or more of the ellipsometric parameters (i.e. R, T, Δ and ψ), preferably the determined angle of rotation of the anisotropy being used for correction of the ellipsometric parameters.

14. Method for improved characterisation of the properties of a sample according to one of the aspects 10 to 13, further comprising:

implementing one or more further measurements of the Stokes vector of the received radiation, in which the polarisation state and/or individual or combinations of other parameters of the components (wavelength, coherence and/or adjustments of the configurations K2 to K4) is changed relative to the first and/or the second measurement, preferably a mutual assignment of the first and of the second measurement with the further measurement(s) to vectors of measured results being effected for respectively the same regions of the sample, and preferably furthermore from these, further, supplementary information for optical characterisation of the sample regions being derived.

15. Method for improved characterisation of the properties of a sample according to one of the aspects 10 to 14, further comprising:

an evaluation for linking the (intermediate) results of the sample regions to the results for the entire sample, which comprises one or more of the following evaluations and which can depend, in sequence, upon the construction of the sensor system and/or the type of examined samples:

calculation of the angle of incidence, and also for transmission arrangements, preferably also of the exit angle(s) from the measured values and/or data supplementing the measured values (configuration K6), and/or choice of the most suitable object model as a function of the measured values and/or prior knowledge about the sample, and/or calculation of physical properties of the sample/sample regions which can be derived directly from the determined characteristic variables (such as for example refractive index and/or extinction coefficient) or can be derived further from these (for example tension, sugar content, and/or temperature), an evaluation which recognises local anomalies and, preferably, classifies them also by a correction calculation taking into account the polarisation effects with respect to type and/or size into:

decorative local anomaly (scratches, spots, dull places . . . ), material anomaly (coating defects, roughness, bubbles, particle inclusion . . . ) or interfaces (object edge, molten regions . . . ), and determines further optionally the course thereof in or on the sample.

16. Method for improved characterisation of the properties of a sample according to the preceding aspect, further comprising:

a comparison of these results with specifications and based on this comparison a classification of the sample (e.g. in the form of good or bad for automatic (bulk material) sorting systems).

17. Use according to one of the preceding aspects 1 to 16,
   a. of a retroreflex sensor for improved characterisation of the properties of a sample or of a method for application of ellipsometric measuring methods in samples or measured objects, the position or inclination of which in the measuring field is not defined constantly and/or precisely, or
   b. of a retroreflex sensor for improved characterisation of the properties of a sample or of a method for layer thickness determination of coated and/or enameled surfaces and/or recognition and/or classification of coating defects, or
   c. of a retroreflex sensor for improved characterisation of the properties of a sample or of a method for differentiation or testing for homogeneity of different surfaces with respect to type of material and/or type of coating and/or layer thickness and/or roughness, or
   d. of a retroreflex sensor for improved characterisation of the properties of a sample or of a method according to one of the preceding claims for determining the geometry of the sample and/or the rotational position of the sample in the measuring region.

The invention claimed is:

1. A retroreflector-based sensor system for optical characterisation of a sample, having a transmitter for irradiating the sample which is positioned in the transmitter beam path, a retroreflector which is positioned behind the sample in the transmitter beam path such that it reflects radiation in the transmitter beam path coming from the sample and incident thereon in the receiving beam path back onto the sample,
   the transmitter, the sample, and the retroreflector being positioned such that radiation reflected back from the retroreflector in the receiving beam path is again incident on the sample and is reflected back or transmitted from the latter in the direction towards the transmitter, and
   a receiver which is positioned in the receiving beam path such that it detects radiation reflected back from the retroreflector, incident again on the sample and reflected back or transmitted from the latter, in the direction towards the transmitter,
   from the radiation detected by the receiver, measured values being obtainable and evaluatable for optical characterisation of the sample, and
   the sensor system further including one or more optical elements, the one or more optical elements
      modulate a polarization state of the radiation in the transmitter beam path and/or in the receiving beam path such that radiation which is polarized alternately in at least two different states of polarization is emitted,
      modulate a direction of the radiation in the transmitter beam path and/or in the receiving beam path,
      modulate a coherence of the radiation in the transmitter beam path and/or in the receiving beam path,
      modulate a wavelength of the radiation in the transmitter beam path and/or in the receiving beam path,
      modulate an intensity of the radiation in the transmitter beam path and/or in the receiving beam path,
      modulate a spectral splitting state of the radiation in the transmitter beam path and/or in the receiving beam path, and/or
      modulate an offset between the transmitter beam path, on the one hand, and the receiving beam path, on the other hand.

2. The retroreflector-based sensor system according to claim 1, wherein the sensor system includes a mover of the transmitter, the sample, the retroflector and/or the receiver.

3. The retroreflector-based sensor system according to claim 1, wherein the receiver is configured such that, from the radiation detected by it and also by it or by an evaluation unit of the sensor system, the entire polarisation state of this radiation or the complete Stokes vector of this radiation can be determined.

4. The retroreflector-based sensor system according to claim 1, wherein the sensor system includes (a) means for obtaining additional information about the sample and/or about the radiation of the transmitter beam path.

5. The retroreflector-based sensor system according to claim 1, wherein the sensor system includes a means for standardisation of the measured values.

6. The retroreflector-based sensor system according to claim 1, wherein one or more of the one or more optical elements, the mover, the means for obtaining additional information about the sample and/or about the radiation of the transmitter beam path, and the means for standardization of the measure values are positioned or configured in the transmitter beam path, in the receiving beam path, in/on the transmitter, in/on the retroreflector, in/on the receiver, in/on a housing including or comprising both the transmitter and the receiver, or is/are provided such that the sample, the retroreflector or one of the configuration means can be scanned optically by it/them.

7. The retroreflector-based sensor system according to claim 1, wherein the transmitter, the retroreflector, and the receiver are configured and positioned such that the radiation which is reflected back at the retroreflector, viewed relative to the transmitter beam path, widens in at least portions of the receiving beam path on the identical path or widens on a path offset thereto.

8. The retroreflector-based sensor system according to claim 1, wherein
   the transmitter, the sample and the retroflector are positioned in reflection arrangement, the light coming therefore from the transmitter in the transmitter beam path and radiated onto the sample is reflected at the sample, coming from there is incident on the retroreflector, is reflected back from the retroreflector into the receiving beam path and onto the sample, is reflected again at the sample and finally is detected by the receiver as radiation which has been reflected twice at the sample,
   or
   the transmitter, the sample, and the retroreflector are positioned in transmission arrangement, the light coming therefore from the transmitter in the transmitter beam path and radiated onto the sample is transmitted through the sample, coming from there is incident on the retroreflector, is reflected back by the retroreflector into the receiving beam path and onto the sample, is transmitted again through the sample and finally is detected by the receiver as radiation which has been transmitted twice through the sample.

9. The retroreflector-based sensor system according to claim 1, wherein
   the transmitter and the receiver are positioned adjacent to each other, directly adjacent to each other or as closely adjacent to each other as possible,
   or the receiver is positioned in a spatial region in which the transmitter is also positioned, or the transmitter and the receiver are integrated or positioned in or inside one and the same housing.

10. The retroreflector-based sensor system according to claim 1, wherein the transmitter and the receiver are configured as a point-measuring system, or the transmitter and the receiver are configured as a scanner system.

\* \* \* \* \*